US010076833B2

(12) United States Patent
Tada et al.

(10) Patent No.: US 10,076,833 B2
(45) Date of Patent: Sep. 18, 2018

(54) ELECTRIC TOOLS

(71) Applicant: MAKITA CORPORATION, Anjo-shi, Aichi (JP)

(72) Inventors: Yoshiro Tada, Anjo (JP); Masanori Furusawa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 583 days.

(21) Appl. No.: 14/483,650

(22) Filed: Sep. 11, 2014

(65) Prior Publication Data

US 2015/0104250 A1 Apr. 16, 2015

(30) Foreign Application Priority Data

Oct. 10, 2013 (JP) .................................. 2013-212929
Oct. 10, 2013 (JP) .................................. 2013-212931

(51) Int. Cl.
*B25F 5/02* (2006.01)
*H01M 2/10* (2006.01)

(52) U.S. Cl.
CPC ............. *B25F 5/02* (2013.01); *H01M 2/1022* (2013.01); *Y10T 403/7073* (2015.01)

(58) Field of Classification Search
CPC ... Y02E 60/12; H01M 2/055; H01M 10/6235; B25F 5/02
USPC ........................................ 320/114; 173/217
See application file for complete search history.

(56) References Cited

U.S. PATENT DOCUMENTS

| | | | |
|---|---|---|---|
| 2004/0242042 A1 | 12/2004 | Buck et al. | |
| 2006/0119318 A1* | 6/2006 | Serdynski | H01M 2/34 320/114 |
| 2008/0302552 A1* | 12/2008 | Kondo | B25F 5/006 173/217 |
| 2011/0181238 A1* | 7/2011 | Soar | B60N 2/24 320/108 |
| 2011/0198103 A1* | 8/2011 | Suzuki | B25F 5/00 173/46 |
| 2012/0048587 A1 | 3/2012 | Umemura et al. | |
| 2014/0326477 A1* | 11/2014 | Thorson | B23Q 11/0032 173/171 |
| 2015/0214520 A1* | 7/2015 | Nishikawa | B25F 5/02 429/100 |

FOREIGN PATENT DOCUMENTS

| | | |
|---|---|---|
| CN | 102832362 A | 12/2012 |
| DE | 3502449 A1 | 8/1985 |

(Continued)

OTHER PUBLICATIONS

Aug. 26, 2015 Office Action issued in German Patent Application No. 10 2014 014 693.6.

(Continued)

*Primary Examiner* — Nathaniel Pelton
*Assistant Examiner* — Johali Torres Ruiz
(74) *Attorney, Agent, or Firm* — Oliff PLC

(57) ABSTRACT

An electric tool may include a battery mount portion having a guide groove structure that can be slidably fitted with a guide projection structure of a rechargeable battery. A reinforcing member may be attached to the guide groove structure of the battery mount portion and may include a connecting structure for detachably connecting the reinforcing member to the guide groove structure.

14 Claims, 18 Drawing Sheets

(56) References Cited

FOREIGN PATENT DOCUMENTS

| | | |
|---|---|---|
| DE | 3844093 A1 | 7/1990 |
| JP | S61-219585 A | 9/1986 |
| JP | A-2010-240797 | 10/2010 |
| JP | 2011-161603 A | 8/2011 |

OTHER PUBLICATIONS

Jul. 6, 2016 Office Action issued in Chinese Patent Application No. 201410524935.X.
Jan. 31, 2017 Office Action issued in Japanese Patent Application No. 2013-212929.

\* cited by examiner

ELECTRIC TOOLS

This application claims priority to Japanese patent application serial numbers 2013-212929 and 2013-212931, the contents of which are incorporated herein by reference.

BACKGROUND OF THE INVENTION

Field of the Invention

Embodiments of the present invention relate to electric tools to which rechargeable batteries serving as power sources can be mounted as they are slid along portions of the electric tools.

Description of the Related Art

Electric tools to which rechargeable batteries serving as power sources can be mounted are known. In these electric tools, an electric motor disposed within the electric tool may rotate with the supply of electric power from the mounted rechargeable battery. The rotation of the electric motor may be appropriately used in performing functions as required by the electric tool. Some of known electric tools are configured such that a rechargeable battery can be mounted and removed as it is slid along a portion of the electric tool (for example, see JP-A-2010-240797).

In this connection, a guide groove structure may be provided on a battery mount portion of the electric tool. The rechargeable battery is mounted through sliding. A guide projection structure may be formed on the rechargeable battery for fitting with the guide groove structure in a sliding direction. In this way, the guide projection structure fitted into the guide groove structure may serve to guide the sliding movement of the rechargeable battery.

When the remaining battery level of the rechargeable battery becomes low, the rechargeable battery can be removed from the electric tool and can be recharged by a charger. After the battery has been fully charged, the battery may be again mounted to the electric tool. As the battery is repeatedly mounted to and removed from the electric tool a number of times, it may be possible that a contact surface of the guide groove structure may become worn to the point that some clearance may be produced between the contact surfaces of the guide groove structure and the guide projection structure. In order to inhibit the contact surface of the guide groove structure from being worn, it has been proposed to attach a reinforcing member to the contact surface by welding or heat crimping.

However, because the guide groove structure is formed by two separate molded portions that are joined to each other to form the guide groove structure, it is difficult to attach the reinforcing member to the guide groove structure by welding or heat crimping.

Therefore, there has been a need in the art for a technique that allows the reinforcing member to be easily and securely attached.

SUMMARY OF THE INVENTION

In one aspect according to the present teachings, an electric tool may include a battery mount portion having a guide groove structure that can be slidably fitted with a guide projection structure of a rechargeable battery. A reinforcing member may be attached to the guide groove structure of the battery mount portion and may include a connecting structure detachably connecting the reinforcing member to the guide groove structure.

DETAILED DESCRIPTION OF THE INVENTION

Figure 1:
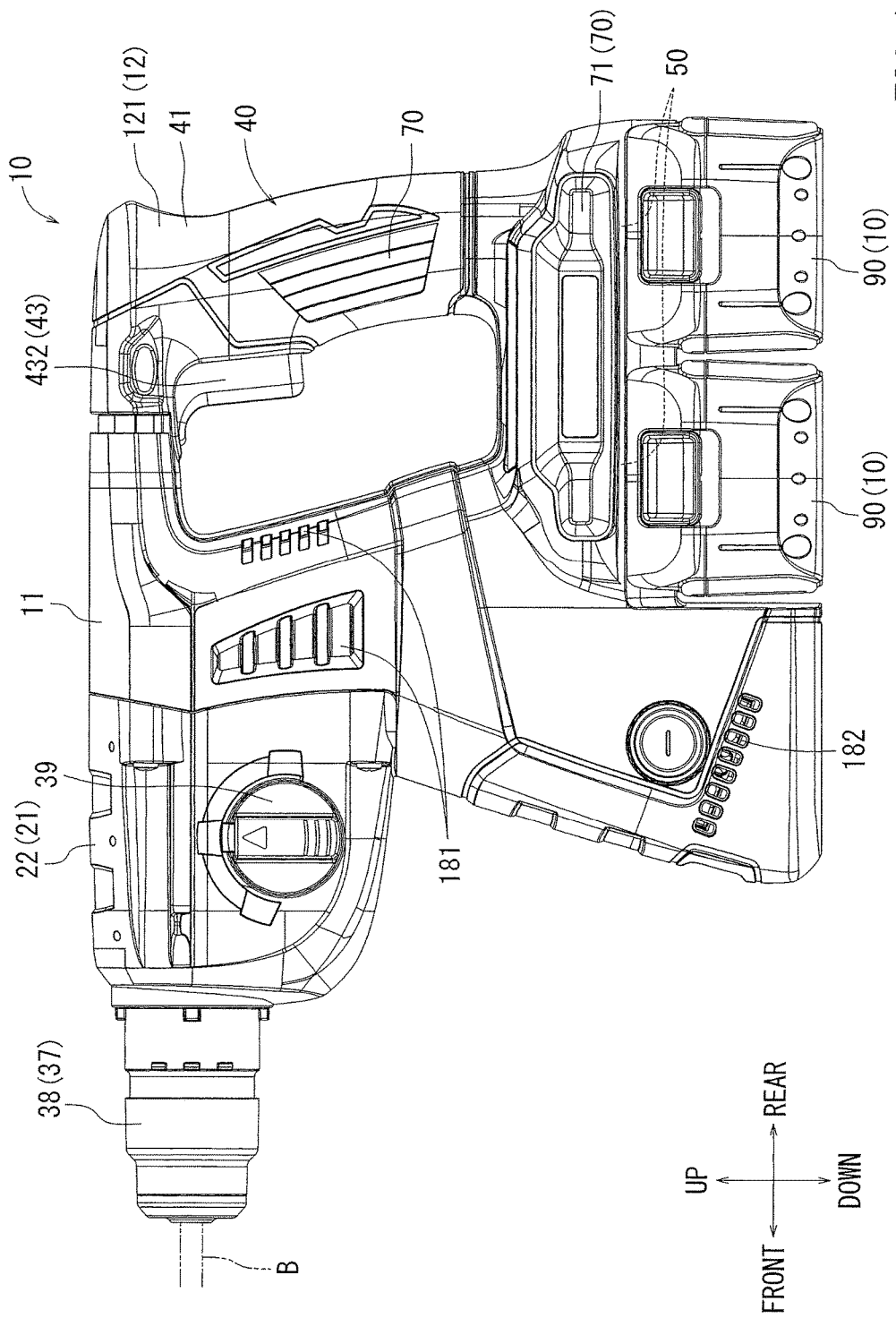
FIG. 1 is a left side view of a hammer drill as an example of an electric tool according to a representative embodiment.
Figure 2:
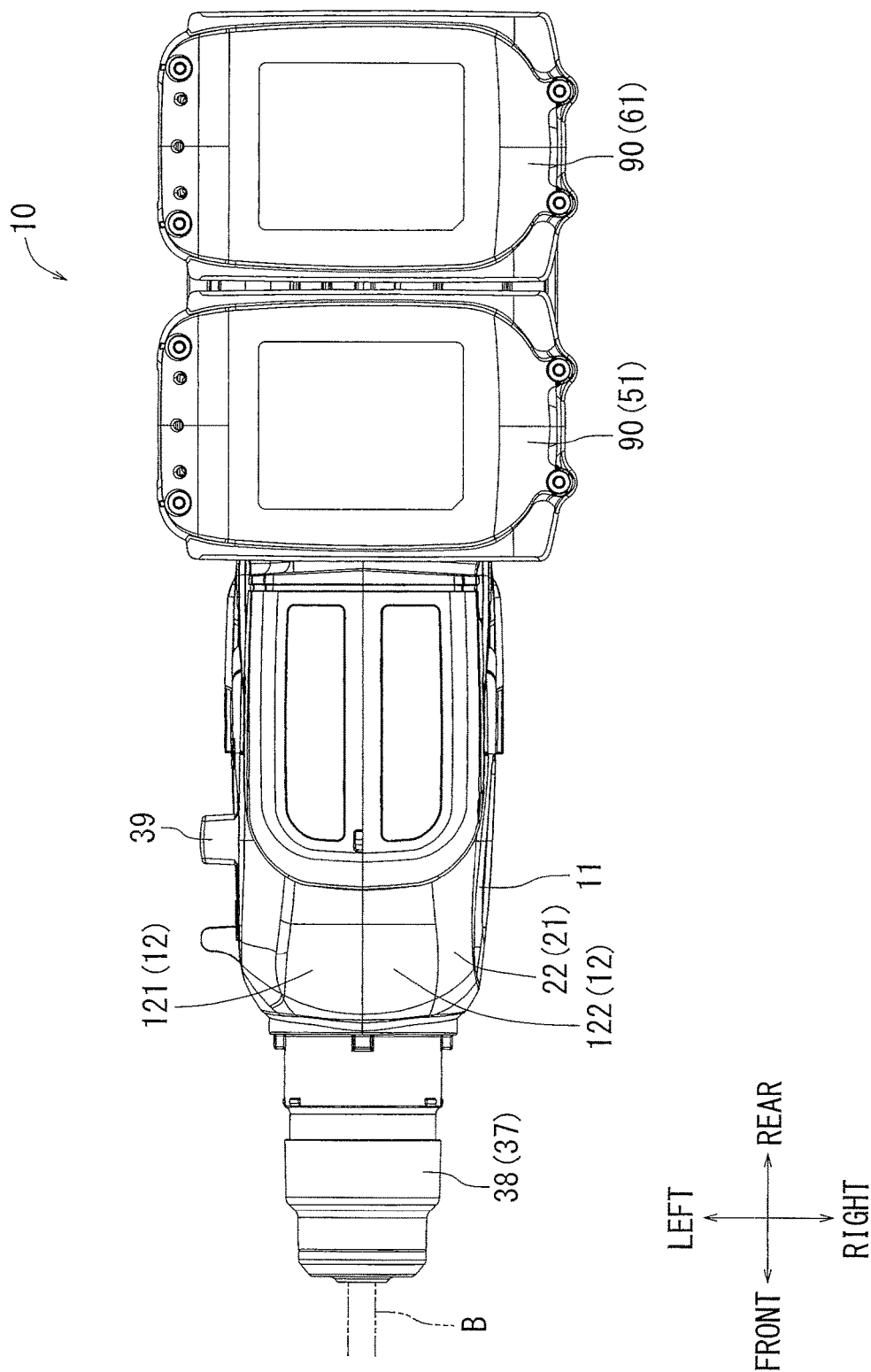
FIG. 2 is a bottom view of the hammer drill of FIG. 1.

In one embodiment, an electric tool may include a battery mount portion, a drive device and a reinforcing member. The battery mount portion may be configured such that a rechargeable battery can be mounted to the battery mount portion as the rechargeable battery is slid along the battery mount portion. The drive device may be driven with a supply of an electric power from the rechargeable battery. The battery mount portion may include a first molded member and a second molded member divided so as to be respectively located on a front side and a rear side with respect to a sliding direction of the rechargeable battery along the battery mount portion. The first molded member and the second molded member may be joined together to form the battery mount portion. The battery mount portion may further include a guide groove structure configured to be fitted with a guide projection structure of the rechargeable battery in the sliding direction so as to guide the rechargeable battery to move in the sliding direction when the rechargeable battery is mounted to the battery mount portion. The reinforcing member may be attached to the guide groove structure of the battery mount portion so as to cover a slide contact part of the guide groove structure where the guide projection structure slidably contacts the guide groove structure. The reinforcing member may be connected to the guide groove structure as the first reinforcing member is moved toward opposing portions of the first molded member and the second molded member. This typically occurs before the first molded member and the second molded member are joined together. The reinforcing member may include an engaging structure that is engaged with portions of the first molded member and the second molded member. This inhibits removal of the reinforcing member from the guide groove structure when the first molded member and the second molded member are joined together to form the battery mount portion.

With this arrangement, the reinforcing member can be connected to the guide groove structure when the first molded member and the second molded member are joined together. In addition, because the reinforcing member includes the engaging structure, it is possible to inhibit removal of the reinforcing member from the guide groove structure when the first molded member and the second molded member are joined together to form the battery mount portion. In this way, the reinforcing member can be easily assembled without the need for welding. In addition, it is possible to prevent removal of the reinforcing member from the portion where the reinforcing member has been assembled.

The reinforcing member may have a substantially U-shape as viewed in the sliding direction and may have three sides extending in three different directions. With this reinforcing member, it is possible to reinforce the slide contact surface from three different directions intersecting the sliding direction. In this way, it is possible to use a single reinforcing member to efficiently reinforce the slide contact surface that may face in a plurality of different directions.

The engaging structure may include a first engaging structure and a second engaging structure respectively provided on two of three sides of the reinforcing member opposing each other. In this way, the engagement of the reinforcing member can be made at different positions with balanced engaging forces. Therefore, it is possible to more assuredly inhibit the reinforcing member from being removed.

The engaging structure may include at least one guide outer edge portion inclined relative to a joining direction of the first molded member and the second molded member. The at least one guide outer edge portion may guide the reinforcing member such that the reinforcing member is brought to a position to be assembled as the first molded member and the second molded member are joined together. With this arrangement, the reinforcing member can be automatically assembled as the first molded member and the second molded member are joined together. Therefore, it is possible to improve the convenience in assembling the reinforcing member.

The reinforcing member may be assembled at a position proximal to an insertion opening end of the guide groove structure. The guide projection structure may be fitted into the guide groove structure starting from the insertion opening end. In this way, it is possible to achieve reinforcement of a region around the insertion opening end, which may tend to be worn quickly than the other region.

The reinforcing member may be detachable from a portion of the guide groove structure where the reinforcing member is assembled. This may occur when the first molded member and the second molded member are released from being joined and are separated from each other. In this way, the reinforcing member can be easily replaced with another reinforcing member. The removed reinforcing member may be disposed of if it is no longer necessary.

The battery mount portion may include a plurality of battery mount portions each having the guide groove structure. The reinforcing member may include a plurality of reinforcing members. The plurality of reinforcing members may be respectively connected to the guide groove structures of the plurality of battery mount portions. With this arrangement, because the plurality of battery mount portions are provided, it is possible to mount a corresponding number of rechargeable batteries. This may increase the power supply capacity to enable the power tool to be used during a long time. Alternatively, it may be possible to increase the power voltage to enable high output in the electric tool. Therefore, it is possible to increase an applicable range of the power tool. Further, due to connection of the plurality of reinforcing members to the guide groove structures of the plurality of battery mount portions, it is possible to reinforce the guide groove structures. As a result, it is possible to increase the applicable range of the power tool while the strength of the plurality of battery mount portions can be improved.

In another embodiment, an electric tool may include a battery mount portion, a drive source and a first battery contact portion. The battery mount portion may be configured such that a rechargeable battery can be mounted to the battery mount portion as the rechargeable is slid in a sliding direction along the battery mount portion. The drive device may be configured to reciprocally move a working tool with a supply of an electric power from the rechargeable battery. The first battery contact portion may be molded from a resilient material so as to be integrated with the battery mount portion. The first battery contact portion may contact the rechargeable battery when the rechargeable battery is mounted to the battery mount portion. The first battery contact portion may urge the rechargeable battery in a first direction parallel to a reciprocating direction of the working tool.

The urging force applied to the rechargeable battery in the first direction parallel to the reciprocating direction of the working tool by the first battery contact portion may inhibit movement of the rechargeable battery relative to the battery mount portion in the first direction. In this way, it is possible to eliminate potential rattling of the rechargeable battery that may be subject to vibrations in the reciprocating direction of the working tool.

The first battery contact portion may be located inside of the battery mount portion, and the resilient material may be introduced from the outside to the inside of the battery mount portion for forming the first battery contact portion. In this way, the first contact portion may be molded by using the same resilient material that may mold another element located on the outer side of the battery mount portion. Therefore, it is possible to suppress an increase in the number of materials at the time of molding. This is advantageous from the viewpoints of facilitating the manufacturing operation, a reduction in production cost, etc.

The first battery contact portion may include a contact distal end portion configured to contact the rechargeable battery in a second direction which intersects the first direction when the rechargeable battery is mounted to the battery mount portion. Therefore, it is possible to support the rechargeable battery while the first battery contact portion contacts the rechargeable battery from two directions, i.e., the first direction and the second direction. In this way, it is possible to suppress any potential rattling of the rechargeable battery with respect to the two directions intersecting each other. As a result, it is possible to further assuredly suppress potential rattling of the rechargeable battery.

The electric tool may further include a second battery contact portion disposed at the battery mount portion and configured to contact the rechargeable battery in a third direction. The rechargeable battery is mounted to the battery mount portion. The third direction may intersect both the first direction and the second direction. In this way, the rechargeable battery can be supported from three directions intersecting each other by the first battery contact portion and the second battery contact portion. Hence, it is possible to suppress potential rattling of the rechargeable battery with respect to three directions intersecting each other. As a result, it is possible to further suppress potential rattling of the rechargeable battery.

The battery mount portion may further include a guide groove structure. The guide groove structure may be configured to be fitted with a guide projection structure of the rechargeable battery in the sliding direction so as to guide the rechargeable battery to move in the sliding direction when the rechargeable battery is mounted to the battery mount portion. The first contact portion may be disposed at the guide groove structure. The guide groove structure may surround the guide projection structure. Therefore, it may be possible to efficiently eliminate the rattling in a multiplicity of directions of the rechargeable battery mounted to the battery mount portion.

The electric tool may further include a body housing including the battery mount portion, an electric component disposed within the body housing, and a component support portion configured to contact and support the electric component within the body housing. The component support portion may be formed of the same resilient material as that of the first battery contact portion. Therefore, it is possible to suppress an increase in the number of materials at the time of molding the component support portion. This is advantageous from the viewpoint of facilitating the manufacturing operation, a reduction in production cost, etc.

The battery mount portion may comprise a plurality of battery mount portions each capable of mounting the rechargeable battery. Therefore, it is possible to increase the power supply ability.

The sliding direction of the rechargeable battery may intersect the reciprocating direction of the working tool. With this arrangement, it is possible to reduce the size in the reciprocating direction of the rechargeable battery.

Representative embodiments of the present invention will now be described with reference to the drawings. Numeral 10 in FIGS. 1 through 5 indicates a hammer drill as an example of an electric tool. The hammer drill 10 also may be an embodiment of a reciprocating tool, and an embodiment of an impact tool.

In describing the hammer drill 10, the front, rear, upper, lower, left, and right sides are determined with respect to a position as viewed from the side of the user during the use of the hammer drill 10 in a normal fashion. Normally, the hammer drill 10 may be grasped like a pistol when it is to be used. Thus, the direction in which a workpiece to be processed is determined as the front side of the hammer drill 10, and the direction opposite thereto is determined as the rear side of the hammer drill 10. The left, right, upper, and lower sides are determined based on this front-rear direction. The front and rear direction of the hammer drill 10 may be a direction in which a hammer bit B reciprocates and which is orthogonal to the sliding direction of rechargeable batteries 90. The front and rear direction of the hammer drill 10 may be hereinafter also called a first direction. The left and right direction of the hammer drill 10 is the direction in which the rechargeable batteries 90 are respectively mounted to battery mount portions 50 through sliding. The left and right direction of the hammer drill 10 may be hereinafter also called a second direction. The up and down direction or a vertical direction will be hereinafter also called a third direction. That is, the direction in which the rechargeable batteries 90 mounted to the battery mount portions 50 face the battery mount portions 50 corresponds to the third direction.

The hammer bit B is mounted to the hammer drill 10 as a working tool, thus forming an electric tool to be used for drilling or the like. As described in detail below, the hammer bit B may be retained by a tool holder 37 while the hammer bit B is prevented from being removed by a chuck 38. This tool holder 37 may serve as a tool output portion.

The hammer drill 10 may be a hand-held type tool wherein the rechargeable batteries 90 may be used as a power source. That is, in general, the hammer drill 10 may be equipped with a hammer drill main body 11 as a tool main body, and the rechargeable batteries 90 as a power source that is detachable with respect to the hammer drill main body 11. Two rechargeable batteries 90 may be mounted to the hammer drill main body 11 so as to provide a large capacity power source. The hammer drill main body 11 to which the rechargeable batteries 90 are thus mounted may include an electric motor 15 driven by the electric power supplied from the rechargeable batteries 90. The electric motor 15 may serve as a drive source.

Figure 4:
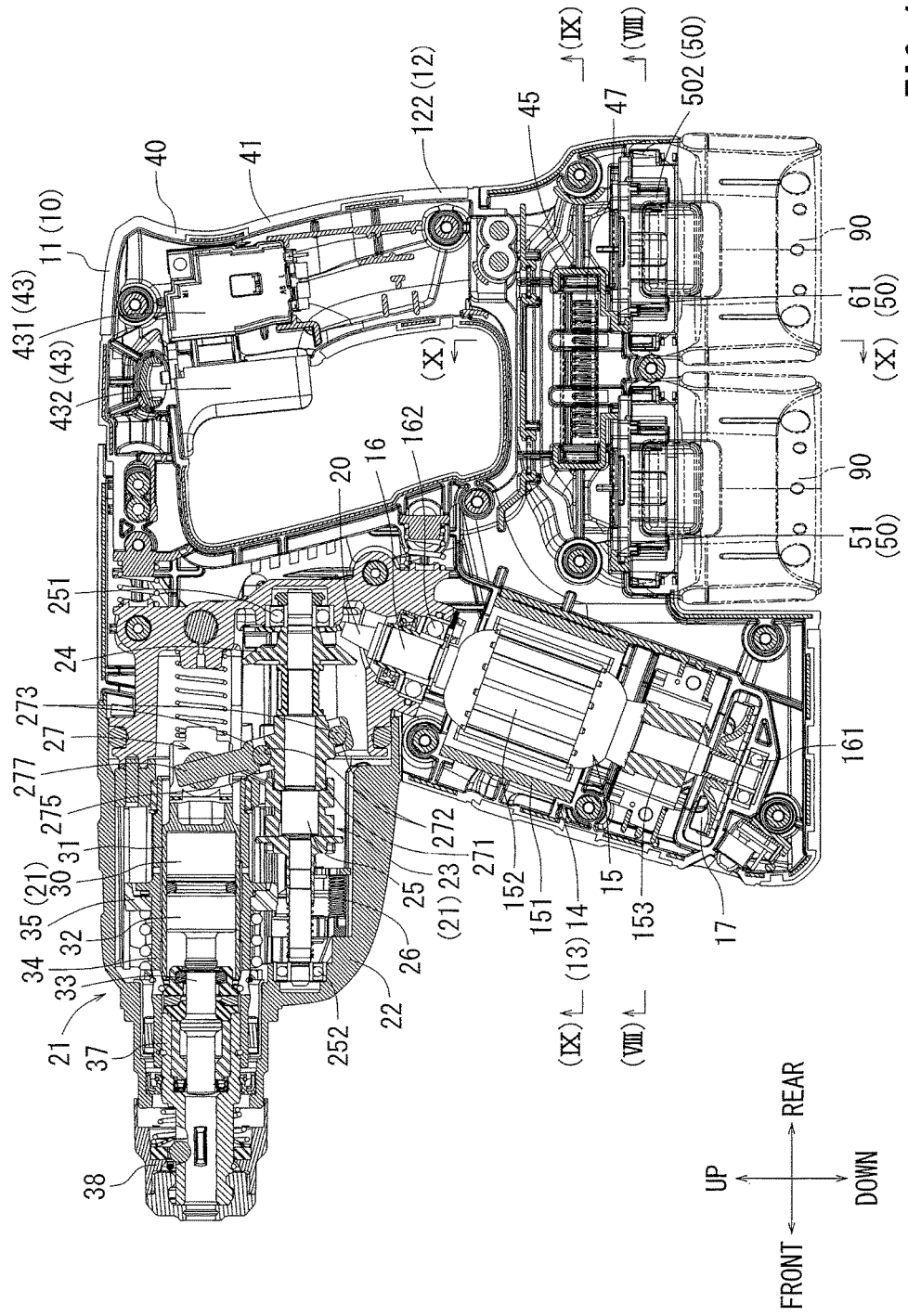
FIG. 4 is a right side half sectional view illustrating the inner structure of the hammer drill.
Figure 5:
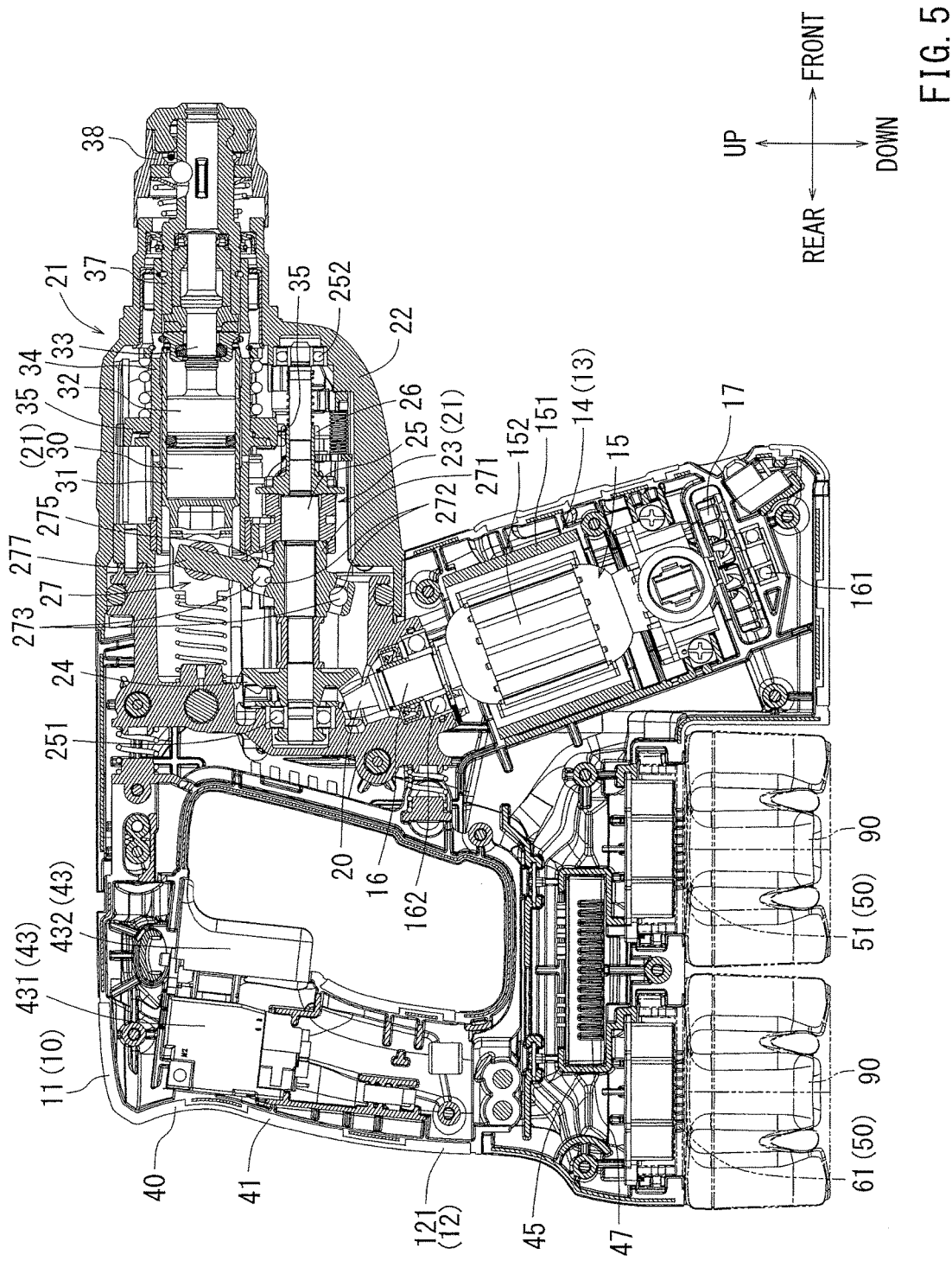
FIG. 5 is a left side half sectional view illustrating the inner structure of the hammer drill.

As shown in FIGS. 4 and 5, the hammer drill main body 11 may generally include a drive portion 13, a handle portion 40, and the battery mount portions 50. The drive portion 13 may include a motor portion 14 and a reciprocating mechanism portion 21. The motor portion 14 may be supported by a main body housing 12 that may serve as a housing for the handle portion 40 and may also serve as a housing for the battery mount portions 50. The reciprocating mechanism portion 21 may be supported by a gear housing 22 that serves as a housing for the reciprocating mechanism portion 21 only. The main body housing 12 supports components such as the electric motor 15 disposed within the hammer drill main body 11 while serving as an enclosure on the rear side of the gear housing 22 of the reciprocating mechanism portion 21. The reciprocating mechanism portion 21 may serve to reciprocate the hammer bit B mounted to the tool holder 37.

The motor portion 14 having the electric motor 15 disposed therein will be described. The electric motor 15 may include a stator 151, a rotor 152, and a commutator 153. The stator 151 may be supported by the main body housing 12. The rotor 152 may be supported by a motor shaft 16 serving as a rotation shaft. With the supply of the electric power, the rotor 152 may rotate relative to the stator 151 using the motor shaft 16 as the rotation shaft. As shown in the drawings, the motor shaft 16 may be arranged so as to extend in the vertical direction while slightly tilting toward the rear side. The lower end portion of the motor shaft 16 may be supported by a lower side bearing 161, and the upper end portion of the motor shaft 16 may be supported by an upper side bearing 162. These two bearings 161 and 162 may be supported by the main body housing 12. A cooling fan 17 for cooling the rotor 152 may be mounted to the lower portion of this motor shaft 16. The cooling fan 17 may be a sirocco fan that produces a flow of air in the centrifugal direction, so that the external air may be drawn from intake openings 181 shown in FIG. 1, etc., and may then be discharged via exhaust openings 182 after cooling the electric motor 15. An input gear 20 is provided at the upper end of the motor shaft 16. This input gear 20 serves to input the rotational drive of the motor shaft 16 to the reciprocating mechanism portion 21. The input gear 20 may be formed as a bevel gear.

The reciprocating mechanism portion 21 will now be described. The reciprocating mechanism portion 21 may be arranged on the upper side of the motor portion 14. The reciprocating mechanism portion 21 may convert the rotational drive force of the electric motor 15 as appropriate before being output. The reciprocating mechanism portion 21 may be a power transmission mechanism having a swash bearing type swinging mechanism 27. The reciprocating mechanism portion 21 may be constructed by installing a drive conversion portion 23 and a reciprocating portion 30 inside the gear housing 22. The drive conversion portion 23 may convert the rotational drive force input from the input gear 20 into a rotational driver force and a reciprocating motion before transmitting the same to the hammer bit B.

The drive conversion portion 23 may generally include a bevel gear 24, an intermediate shaft 25, and a rotation transmission gear 26. The bevel gear 24 is in mesh with the above-mentioned input gear 20, and the intermediate shaft 25 is provided as a rotation shaft. The intermediate shaft 25 may rotate together with the bevel gear 24 that rotates upon receiving the rotation of the input gear 20. The intermediate shaft 25 may be arranged so as to extend in the front and rear directions. The rear end portion of the intermediate shaft 25 may be rotatably supported by a rear side bearing 251, and the front end portion thereof may be rotatably supported by a front side bearing 252. The two bearings 251 and 252 are respectively supported by the main body housing 12 and the gear housing 22.

A rotation transmission gear 26 may be mounted to the outer periphery near the front end of the intermediate shaft 25. This rotation transmission gear 26 rotates together with the intermediate shaft 25 and is in mesh with a rotation-receiving gear 35 arranged on the upper side thereof. The rotation-receiving gear 35 may be mounted to a rotary cylinder 34 disposed at the outer periphery of a tubular piston 31 which will be described later. In this way, the rotation receiving gear 35 can rotate together with the rotary cylinder 34. The tool holder 37 may rotate together with the rotary cylinder 34 and may be mounted to the front portion of the rotary cylinder 34.

The swash bearing type swinging mechanism 27 may be disposed at the intermediate portion of the intermediate shaft 25. The swinging mechanism 27 may convert the rotational drive of the intermediate shaft 25 to a reciprocating movement. The swinging mechanism 27 may include a rotary body 271, rolling balls 273, and a swinging ring 275. The rotary body 271 may be integrated with the intermediate shaft 25. A ball groove 272 may be formed in the outer circumferential surface of the rotary body 271. This ball groove 272 may be tilted in the front and rear direction with respect to a plane perpendicular to the rotational axis of the intermediate shaft 25. The radially inner portions of the rolling balls 273 may be fitted into the ball groove 272. The rolling balls 273 serve as rolling bearing balls. The radially outer portions of the rolling balls 273 may be fitted into the inner peripheral surface of the swinging ring 275. On the upper side of the swinging ring 275, there is provided a swinging rod 277 protruding from the swinging ring 275, and the rear portion of a tubular piston 31 described below is connected to the upper end of this swinging rod 277. In FIG. 1, numeral 39 indicates a switch operable for switching a mode of the operation of the hammer bit B.

With respect to the swinging mechanism 27, when the rotary body 271 rotates together with the intermediate shaft 25, the rolling balls 273 guided by the ball groove 272 may change the tilt angle of the swinging ring 275. As the tilt angle of the swinging ring 275 is thus changed, the swinging rod 277 above the swinging ring 275 may swing in the front and rear direction. The swinging of the swinging rod 277 causes the reciprocating portion 30 (having the tubular piston 31) to reciprocate so as to advance and retreat in the front and rear directions.

The reciprocating portion 30 may generally include the tubular piston 31, a striker 32, and an impact bolt 33. The tubular piston 31 may be formed as a hollow tube, and may be rotatably supported by the gear housing 22. The tubular piston 31 may move in the front and rear directions within the rotary cylinder 34. On the outer circumference of the rotary cylinder 34, there may be provided a rotation-receiving gear 35 that meshes with a rotation transmitting gear 26 provided on the outer circumference of the intermediate shaft 25.

Inside the tubular piston 31, the striker 32 is arranged to serve as an impact application member. The striker 32 can advance and retreat in the front and rear directions with respect to the rotary cylinder 34. The striking force of the striker 32 may be transmitted to the hammer bit B as an axial impact force via the impact bolt 33 arranged on the front side with respect to the hammer bit B. The hammer bit B may be retained by the tool holder 37 and may be prevented from removal by the chuck 38. The swinging mechanism 27, the striker 32, and the impact bolt 33 may constitute an impact mechanism. The tool holder 37 is formed substantially as a cylindrical tube that is rotatable with the rotary cylinder 34, and the hammer bit B may be inserted into the tool holder 37. On the front side of the tool holder 37, there is mounted the chuck 38 that may prevent the removal of the hammer bit B. The hammer bit B may operate for machining a work piece as by rotating in the circumferential direction. It receives hammer action striking in the axial direction.

Further, on the rear side of the reciprocating mechanism portion 21, there may be provided a handle portion 40 having a D-shaped configuration as seen from a side view. At the rear portion of the handle portion 40, there may be provided a grip portion 41 to be grasped by a user's hand. The grip portion 41 may be provided with a trigger type operation switch 43. The operation switch 43 may include a switch main body 431 and an operation trigger 432. When the operation trigger 432 is pulled, the switch main body 431 may receive an ON-input. Upon receiving the ON-input, the switch main body 431 may transmit an ON-signal to a controller 47 that will be described later.

The handle portion 40 and the battery mount portion 50 may be formed by the main body housing 12. The main body housing 12 may be formed by joining together a left-hand side half housing 121 and a right-hand side half housing 122 which are separately molded. That is, the main body housing 12 is a molded member. The left-hand side half housing 121 will be hereinafter also called a first molded member, and the right-hand side half housing 122 will be hereinafter called a second molded member. In this way, the main body housing 12 is formed by joining together the left-hand side half housing 121 and the right-hand side half housing 122 that are divided in the right and left direction, i.e., the front and rear direction with respect to the sliding direction of the rechargeable batteries 90 for mounting the rechargeable batteries 90 to the battery mount portions 50. Thus, the right and left direction in which the left-hand side half housing 121 and the right-hand side half housing 122 are divided may coincide with the sliding direction of the rechargeable battery 90 for mounting the rechargeable batteries 90 to the battery mount portion 50. The main body housing 12 may be provided with an outer protection member 70 for protecting the hammer drill 10. The outer protection member 70 may be attached to the main body housing 12 through adhesion or the like. The outer protection member 70 may be formed of an elastomeric member. More specifically, the outer protection cover 70 may be formed of a molded product made of elastomer exhibiting elasticity. Preferably, the outer protection member 70 may be integrated with the main body housing 12 (the left-hand side half housing 121 and the right-hand side half housing 122) through a so-called two-color molding process, in which the outer protection member 70 is molded by an elastomeric material at the same time that the main body housing 12 is molded by a plastic resin. The purpose of providing the outer protection member 70 may be an improvement in the design with respect to the aesthetic aspect, i.e., the outward appearance of the hammer drill 10, mitigation of the shock due to the inevitable external force when the hammer driller 10 is accidentally dropped, or an improvement in the feel when the user uses the hammer drill 10. Therefore, the outer protection member 70 may be made of an elastomeric material or any other material exhibiting elasticity.

Figure 3:
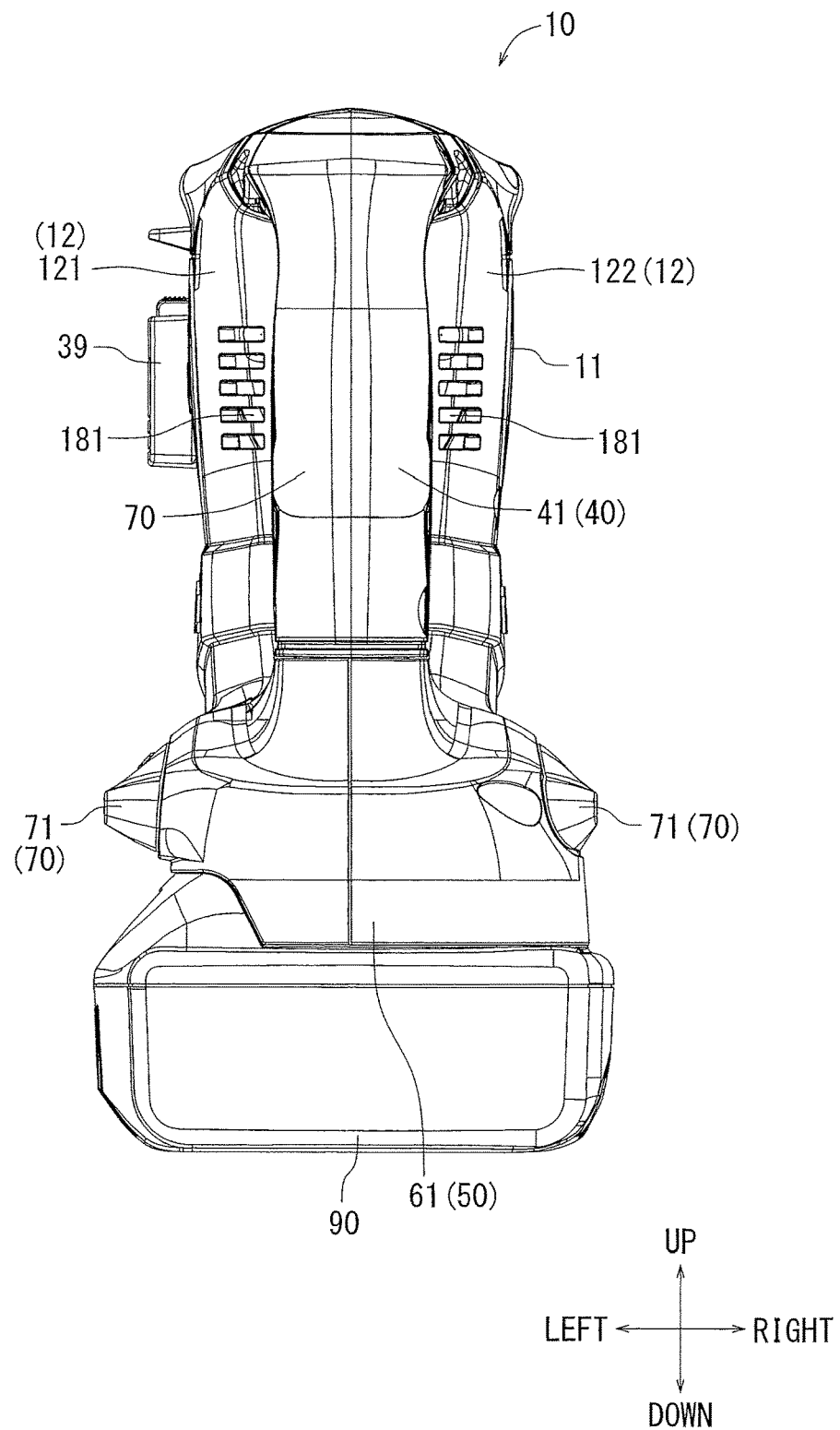
FIG. 3 is a rear view of the hammer drill of FIG. 1.

It should be noted that the outer protection member 70 has portions set as bumper portions protruding in the left and right directions (i.e. the width direction) of the hammer drill main body 11. As shown in FIG. 3, the bumper portions 71 may protrude to the right and left in the width direction on the upper side of the battery mount portions 50. The main purpose of providing the bumper portions 71 is to mitigate the shock due to an inevitable external force. Thus, the bumper portions 71 protruding to the right and left in the width direction may mitigate shock caused by external force.

A portion of the main body housing 12 situated on the lower side of the handle portion 40 may constitute the controller support portion 45 and the battery mount portion 50.

Figure 9:
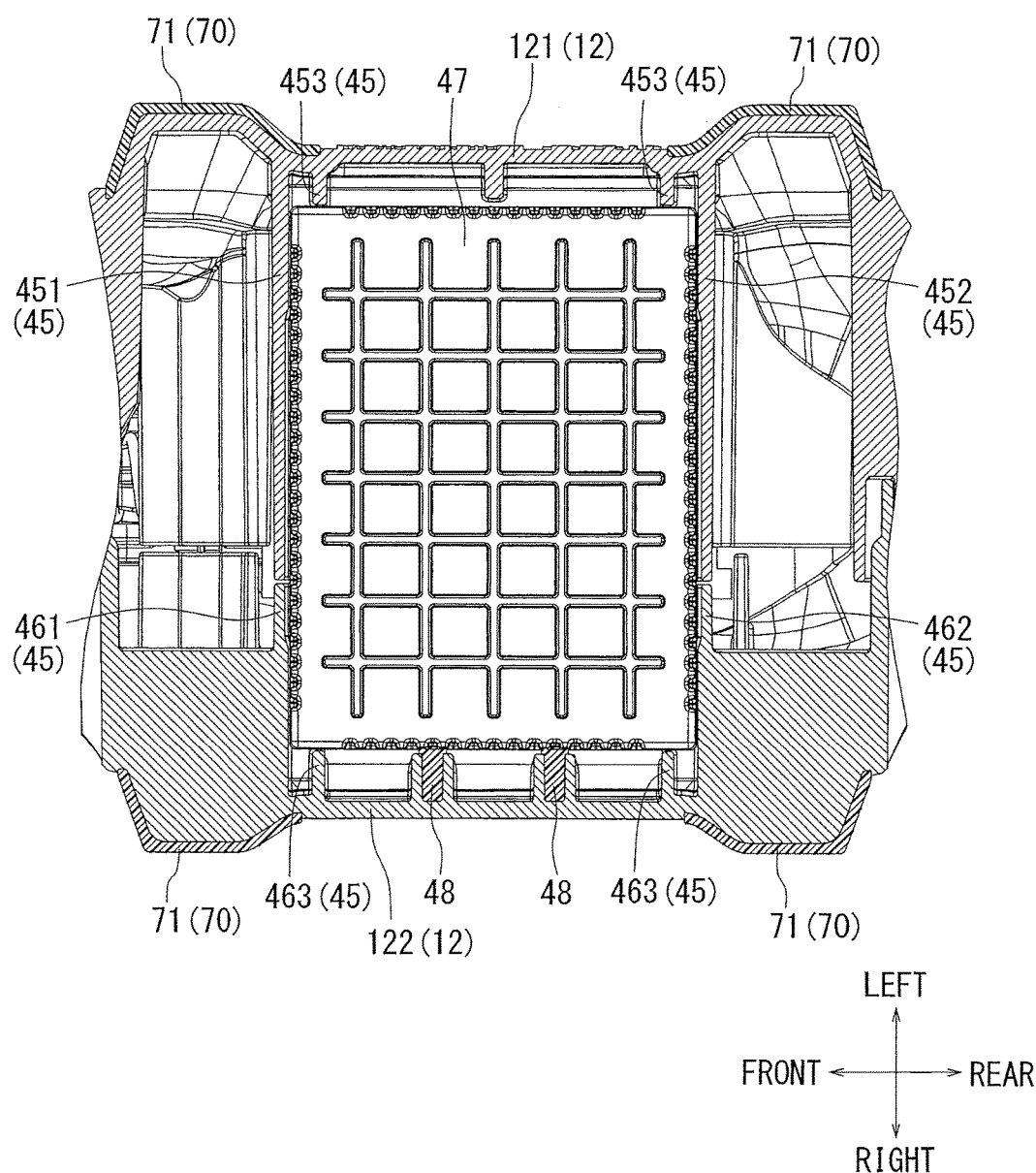
FIG. 9 is a sectional view taken along line (IX)-(IX) of FIG. 4.
Figure 10:
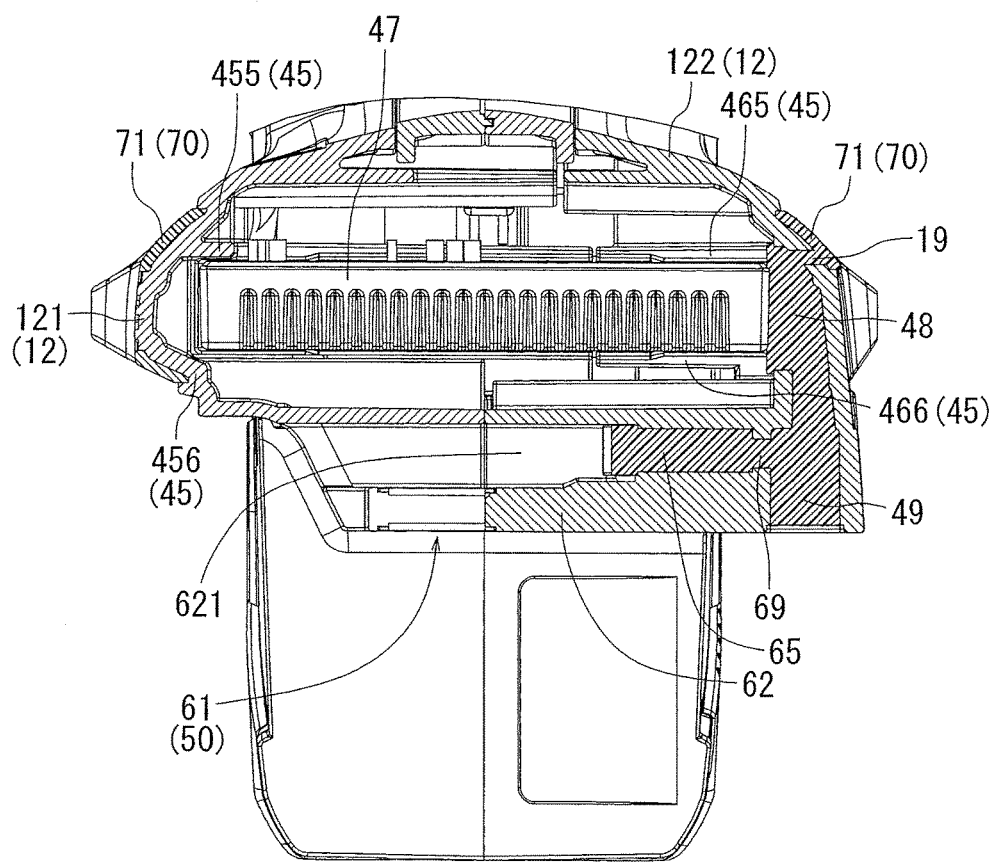
FIG. 10 is a sectional view taken along line (X)-(X) of FIG. 4.

The controller support portion 45 may support a controller 47 disposed therein and may control the power supply to the electric motor 15. Although not shown in FIGS. 4 and 5, the controller 47 may be connected to the electric motor 15 and the battery mount portions 50 via appropriate lead wires. As shown in FIGS. 4, 9, and 10, the controller 47 may be formed in a rectangular external configuration. The controller support portion 45 may formed by a portion of the main body housing 12 that protrudes in a rib-like fashion from the front, rear, upper, lower, left, and right sides toward controller 47 within the main body housing 12.

That is, as shown in FIG. 9, in the left-hand side half housing 121, a front side rib 451, a rear side rib 452, and a left-hand side rib 453 constituting a left side part of the controller support portion 45 are provided so as to protrude toward the inner side. In the right-hand side half housing 122 also, a front side rib 461, a rear side rib 462, and a left-hand side rib 463 constituting a right side part of the controller support portion 45 are provided so as to protrude toward the inner side. The front side ribs 451 and 461 and the rear side ribs 452 and 462 may contact and support the controller 47 so as to hold it from the front and rear sides. Also the left-hand side ribs 453 and the right-hand side rib 463 of the main body housing 12 may contact and support the controller 47 so as to hold it from the left and right sides.

Further, as shown in FIG. 10, in the left-hand side half housing 121, an upper contact portion 455 and a lower contact portion 456 constituting left upper and lower parts of the controller support portion 45 are provided so as to protrude toward the inner side. In the right-hand side half housing 122 also, an upper contact portion 465 and a lower contact portion 466 constituting right upper and lower parts of the controller support portion 45 are provided so as to protrude toward the inner side. The upper contact portions 455 and 465 and the lower contact portions 456 and 466 may contact and support the controller 47 so as to hold it from above and below.

Further, at portions of the controller support portion 45 adjacent to the controller 47, there are provided urging damper portions 48. Each of the urging damper portions 48 may function as a damper which contacts the controller 47 while exerting an urging force. As shown in FIGS. 9 and 10, the urging damper portions 48 may contact the right-hand side surface of the controller 47, and urge the controller 47 to the left. When the bumper portions 71 are molded, the urging damper portions 48 may be molded integrally with the bumper portions 71. More specifically, in the right-hand side half housing 122, there are provided communication holes 19 establishing communication between the exterior and the interior as shown in FIG. 10. The molding material (elastomeric material) may be injected so as to flow through the communication holes 19, so that the bumper portions 71 and the urging damper portions 48 may be molded integrally with each other. The urging damper portions 48 may be arranged between the left-hand side rib 453 and the right-hand side rib 463. The injected molding material may flow from the outer side to the inner side of the main body housing 12 via the communication holes 19. The molding material flowing to the inner side may enter a molding material storage chamber 49 positioned on the lower side of the controller 47. The molding material storage chamber 49 may be provided in order to enhance the molding stability in molding a front battery contact portion 55 (65) that will be described later. The urging damper portions 48 thus provided may support the controller 47 so as to press it to the left due to the elasticity of the molding material. That is, the urging damper portions 48 may support the controller 47 so as to press it in the left and right directions (second direction) orthogonal to the reciprocating direction of the hammer bit B. If a shock is applied to the hammer drill 10 due to an external inevitable force, the urging damper portions 48 may elastically support the controller 47 so as to mitigate the damage of the controller 47 caused by the shock. That is, the urging damper portions 48 serves as component support portions for supporting the controller 47 that is an example of an electric component.

Next, the battery mount portions 50 will be described. The battery mount portions 50 may be two in number and may be arranged in parallel to each other. The two battery mount portions 50 may be arranged in the front and rear directions on the lower side of the controller support portion 45. The two battery mount portions 50 may be substantially of the same construction. Of the two, the battery mount portion 50 arranged on the front side will be hereinafter called a front side battery mount portion 51, and, the battery mount portion 50 arranged on the rear side will be hereinafter called a rear side battery mount portion 61. One rechargeable battery 90 can be attached to each of the front side battery mount portion 51 and the rear side battery mount portion 61. In this way, two rechargeable batteries 90 can be attached to the hammer drill main body 11. In correspondence with the slide-attachment type rechargeable batteries 90, the front side battery mount portion 51 and the rear side battery mount portion 61 may have a structure allowing sliding attachment.

The sliding direction for mounting the rechargeable batteries 90 to the battery mount portions 50 (51 and 61) may be set in the direction from left to right. Between the front side battery mount portion 51 (50) and the rear side battery mount portion 61 (50), there may be provided a partition member 60 separating the battery mount portions 50 from each other. The partition member 60 may be provided with guide groove portions 522 and 621 that will be described later.

Both the front side battery mount portion 51 and the rear side battery mount portion 61 may be substantially of the same construction. Thus, in describing the battery mount portions 50, reference numeral 51 for the front side battery mount portion will be generally referred to, and reference numeral 61 for the rear side battery mount portion will be identified in parentheses.

Figure 6:
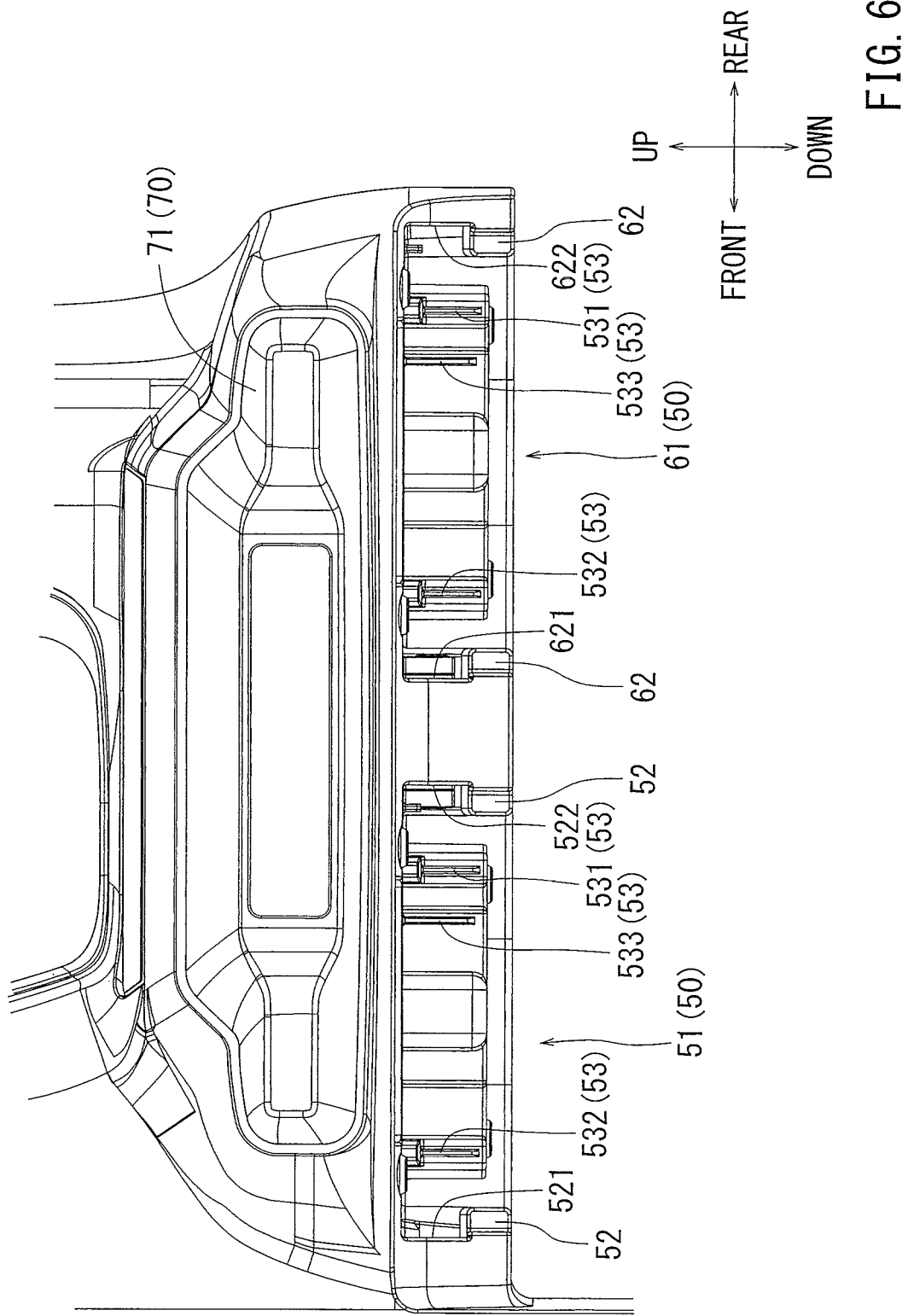
FIG. 6 is an enlarged view of a battery mount portion shown in FIG. 1 with a rechargeable battery removed therefrom.
Figure 7:
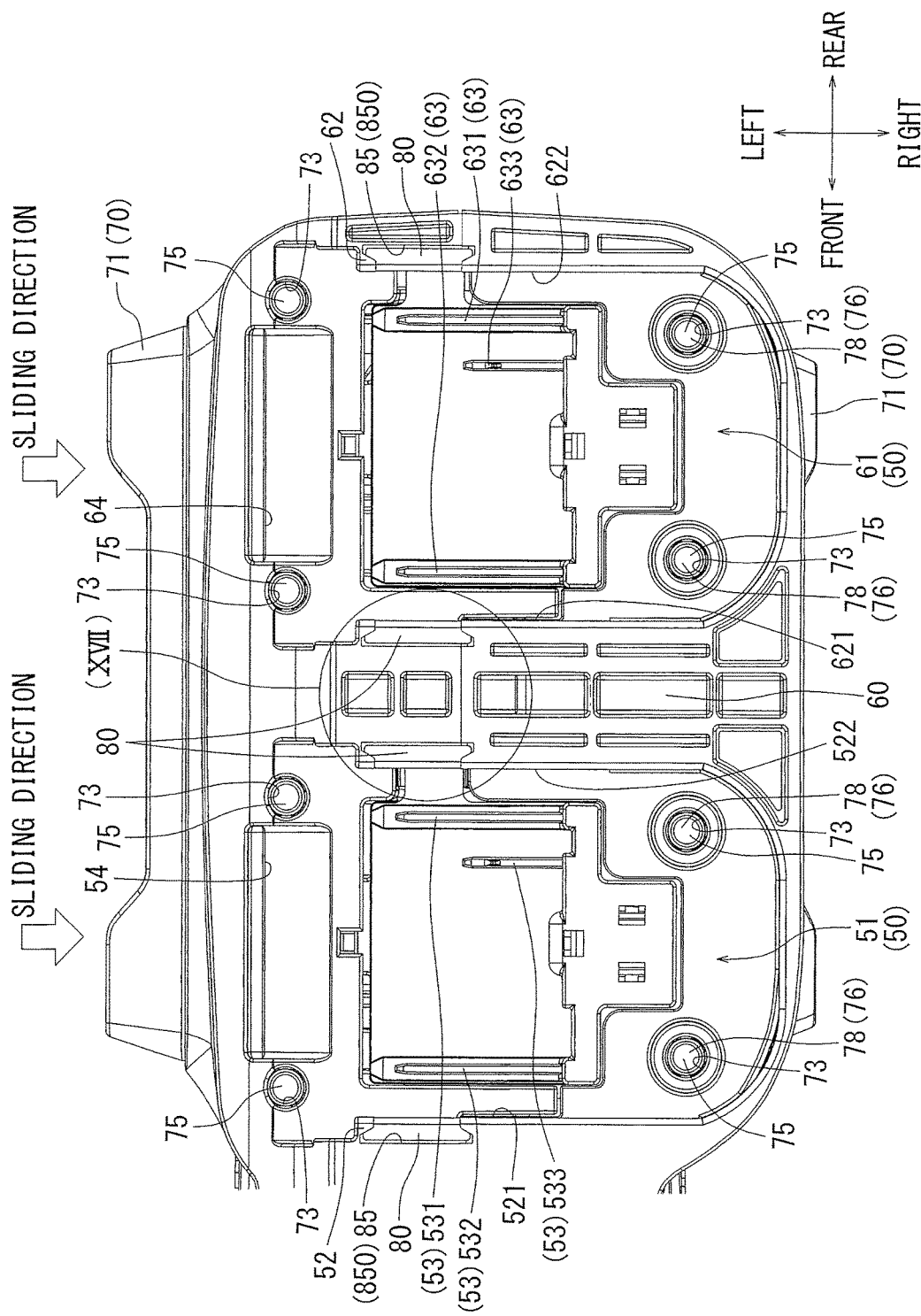
FIG. 7 is an enlarged view of the battery mount portion shown in FIG. 2 with the rechargeable battery removed therefrom.

As shown in FIGS. 6 and 7, the front side battery mount portion 51 (61) may have a structure allowing the rechargeable battery 90 to be attached through sliding. More specifically, the front side battery mount portion 51 (61) may be configured such that the front side battery mount portion 51(61) is mechanically and electrically connected to the rechargeable battery 90 through sliding. The front side battery mount portion 51 (61) may be provided with a pair of guide groove portions 521 and 522 (621 and 622) serving as the structure for sliding attachment. Although not shown in particular, guide projection portions provided on the rechargeable battery 90 may be fitted through insertion into the guide groove portions 521 and 522 (621 and 622) in the sliding direction. The guide groove portions 521 and 522 (621 and 622) into which the guide projection portions are fitted may guide the sliding for mounting the rechargeable battery 90. Further, the front side battery mount portion 51 (61) may be provided with a battery terminal connection portion 53 (63) equipped with a positive pole side terminal 531 (631), a negative pole side terminal 532 (632), and a signal side terminal 533 (633) as a structure for electrical connection. Although not shown in particular, terminal connection portions provided on the rechargeable battery 90 may be connected to the battery terminal connection portion 53 (63) through male/female-connection, in order to connect the rechargeable battery 90 electrically. Further, the front side battery mount portion 51 (61) may be provided with a recess 54 (64) for fixing the rechargeable battery 90 to the front side battery mount portion 51 (61) when the rechargeable battery 90 has been mounted and electrically connected through sliding. Although not shown in particular, the rechargeable battery 90 may have a male hook that can be engaged with the recess 54 (64). The voltage of the rechargeable battery 90 attached through sliding may be set to an appropriate level.

The guide groove portion 522 arranged on the rear side of the front side battery mount portion 51 and the guide groove portion 621 arranged on the front side of the rear side battery mount portion 61 may be respectively provided with battery contact portions 55 and 65. More specifically, the front battery mount portion 55 may be provided at the guide groove portion 522 that is located on the right-hand side with respect to the sliding direction of the rechargeable battery 90 for mounting to the front side battery mount portion 51. The rear battery mount portion 65 may be provided at the guide groove portion 621 that is located on the left-hand side with respect to the sliding direction of the rechargeable battery 90 for mounting to the rear side battery mount portion 61. That is, the front battery contact portion 55 and the rear battery contact portion 65 are provided for the guide groove portions 522 and 621 arranged on the front and rear sides of the partition member 60 between the battery mount portions 51 and 61. The front battery contact portion 55 and the rear battery contact portion 65 may be configured symmetrically with respect to the partition member 60.

The front battery contact portion 55 may be formed so as to have a contact distal end portion 56 and a pressure flat portion 57 arranged in the order in which they contact the rechargeable battery 90. The front battery contact portion 55 may contact the front end portion of the guide projection portion of the rechargeable battery 90 fitted into the guide groove portion 522. This occurs when the rechargeable battery 90 is slid to the front side battery contact portion 51. The contact front end portion 56 may have a front end facing portion 561 formed as an outer edge, and a front end inclined surface portion 562 provided on the inner side of the front end facing portion 561 (the inner side of the front side battery mount portion 51). The front end facing portion 561 may have a planar configuration extending in a direction orthogonal to the sliding direction of the rechargeable battery 90 to be mounted. Thus, the front end facing portion 561 may face the sliding rechargeable battery 90. In contrast, the front end inclined surface portion 562 may have a planar configuration inclined towards the inner side in the sliding direction in which the rechargeable battery 90 is mounted. At the time of sliding of the rechargeable battery 90 before the completion of the attachment, the front end inclined surface portion 562 may contact the rechargeable battery 90 in the sliding direction, and, at the same time, contact the rechargeable battery 90 in a direction toward the inner side of the front side battery mount portion 51 orthogonally crossing the sliding direction. The pressure flat portion 57 may have a planar configuration extending in the sliding direction from the front end with respect to the sliding direction of the front end inclined surface portion 562. Thus, the pressure flat portion 57 may be formed so as to face the most inner side of the front side battery mount portion 51, and to face the front side battery mount portion 51. In this way, the front battery portion 55 can contact the rechargeable battery 90 so as to apply an urging force thereto in the reciprocating direction of the hammer bit B.

The rear battery contact portion 65 may be formed symmetrically with the above-described front battery contact portion 55. That is, the rear battery contact portion 65 also may be formed so as to have a contact front end portion 66 and a pressure flat portion 67 arranged in the order in which they contact the rechargeable battery 90. That is, the rear battery contact portion 65 may contact the front end portion of the guide projection portion of the rechargeable battery 90. The rechargeable battery 90 is fitted into the guide groove portion 622 during the sliding of the rechargeable battery 90 in order to mount it on the rear side battery mount portion 61. The contact front end portion 66 may have a front end facing portion 661 formed as an outer edge, and a front end inclined surface portion 662 provided on the inner side of the front end facing portion 661 (the inner side of the rear side battery mount portion 61). The front end facing portion 661 may have a planar configuration extending in a direction orthogonal to the sliding direction of the rechargeable battery 90 to be attached. Thus, the front end facing portion 661 may face the sliding rechargeable battery 90. In contrast, the front end inclined surface portion 662 may have a planar configuration inclined toward the inner side in the sliding direction in which the rechargeable battery 90 is slid for mounting. At the time of sliding of the rechargeable battery 90 before the completion of the attachment, the front end inclined surface portion 662 may contact the rechargeable battery 90 in the sliding direction and, at the same time, contact the rechargeable battery 90 in a direction toward the inner side of the rear side battery mount portion 90 orthogonally crossing the sliding direction. The pressure flat portion 67 may have a planar configuration extending in the sliding direction from the front end with respect to the sliding direction of the front end inclined surface portion 662. Thus, this pressure flat portion 67 may be formed so as to face the most inner side of the rear side battery mount portion 61, and to face the rear side battery mount portion 61. That is, the rear battery contact portion 65 may be of a configuration capable of applying an urging force to the rechargeable battery 90 in the first direction. This first direction is the reciprocating direction of the hammer bit B.

Figure 8:
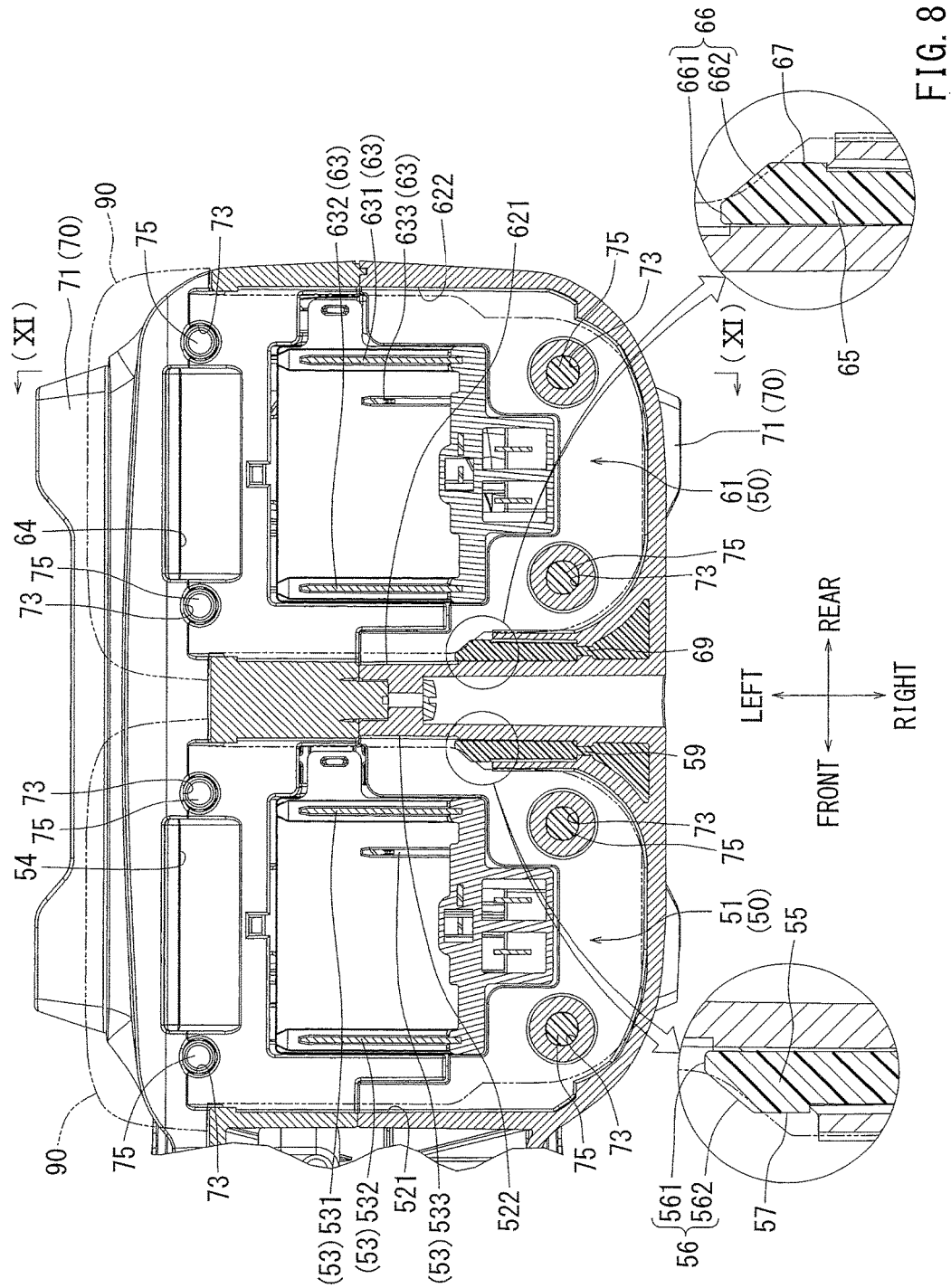
FIG. 8 is a sectional view taken along line (VIII)-(VIII) of FIG. 4.

The front battery contact portion 55 and the rear battery contact portion 65 may be molded by utilizing the same material as that used for molding the bumper portion 71 and the urging damper portion 48. Thus, the front battery contact portion 55 and the rear battery contact portion 65 may be formed so as to exhibit the same elasticity as that of the bumper portion 71 and the urging damper portion 48. That is, the front battery contact portion 55 and the rear batter contact portion 65 may be molded by the molding material injected for molding the urging damper portion 48. More specifically, the partition member 60 may be provided with a front side communication hole 59 and a rear side communication hole 69. The front side communication hole 59 and the rear side communication hole 69 are formed as holes for establishing communication between the molding material storage chamber 49 shown in FIG. 10 along with the guide groove portion 522 and the guide groove portion 621 shown in FIG. 8. The molding material flown into the molding material storage chamber 49 may further flow to form the guide groove portion 522 and the guide groove portion 621 through the front side communication hole 59 and the rear side communication hole 69. The molding material having flown toward the guide groove portion 522 and the guide groove portion 621 can mold the front battery contact portion 55 and the rear contact portion 65. In this way, the front battery contact portion 55 and the rear battery contact portion 65 can be molded simultaneously with and integrally with the bumper portion 71 and the urging damper portion 48. In molding the front battery contact portion 55 and the rear battery contact portion 65, the molding material storage chamber 49 shown in FIG. 10 may serve to stabilize the flow of the molding material for forming them.

In order to eliminate potential rattling of the rechargeable batteries 90 mounted to the battery mount portions 50, each of the battery mount portions 50 may be provided with pin-shaped members 75 that may contact the upper surface of the corresponding rechargeable battery 90. The facing direction, i.e., the contacting direction of the pin-shaped members 75 with respect to the corresponding rechargeable battery 90 may set to a vertical direction which is orthogonal to both the longitudinal direction of the hammer drill 10 set as the first direction, and the sliding direction of the rechargeable battery 90 (the left and light direction of the hammer drill 10) set as the second direction.

Figure 11:
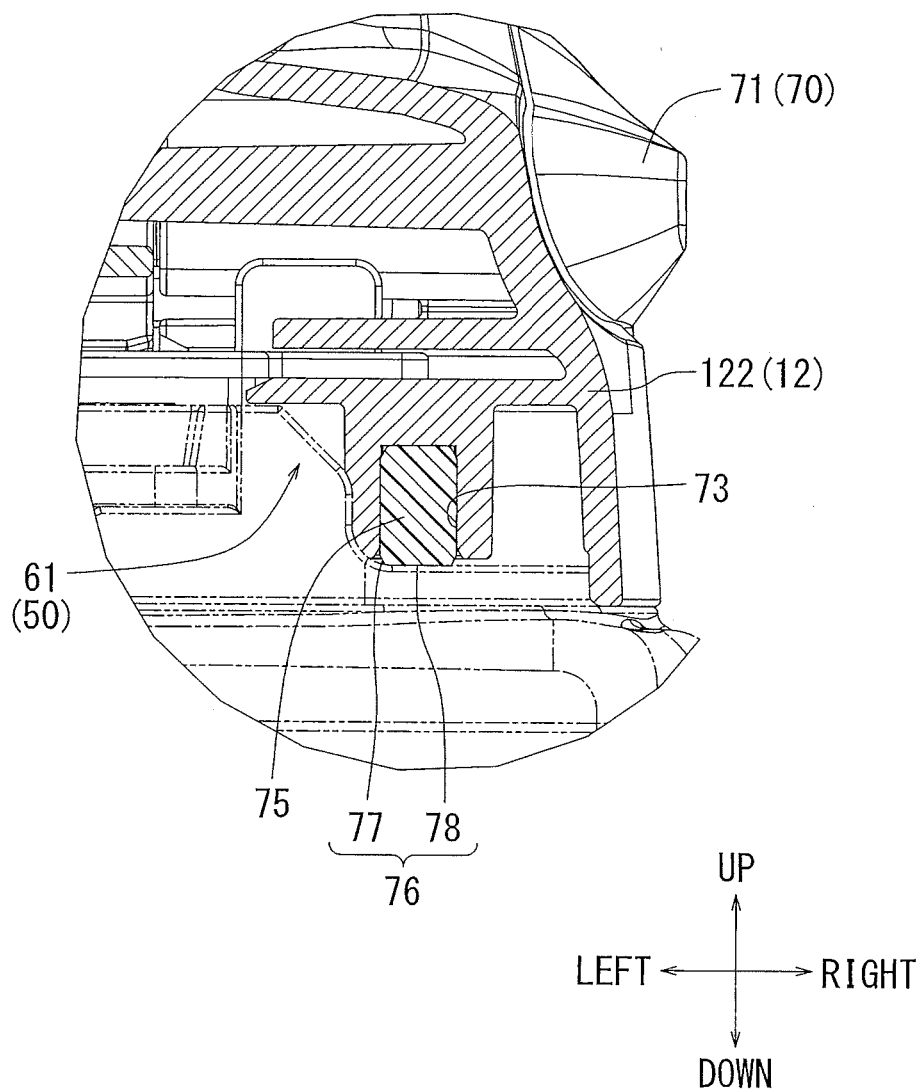
FIG. 11 is a sectional view taken along line (XI)-(XI) of FIG. 8.
Figure 12:
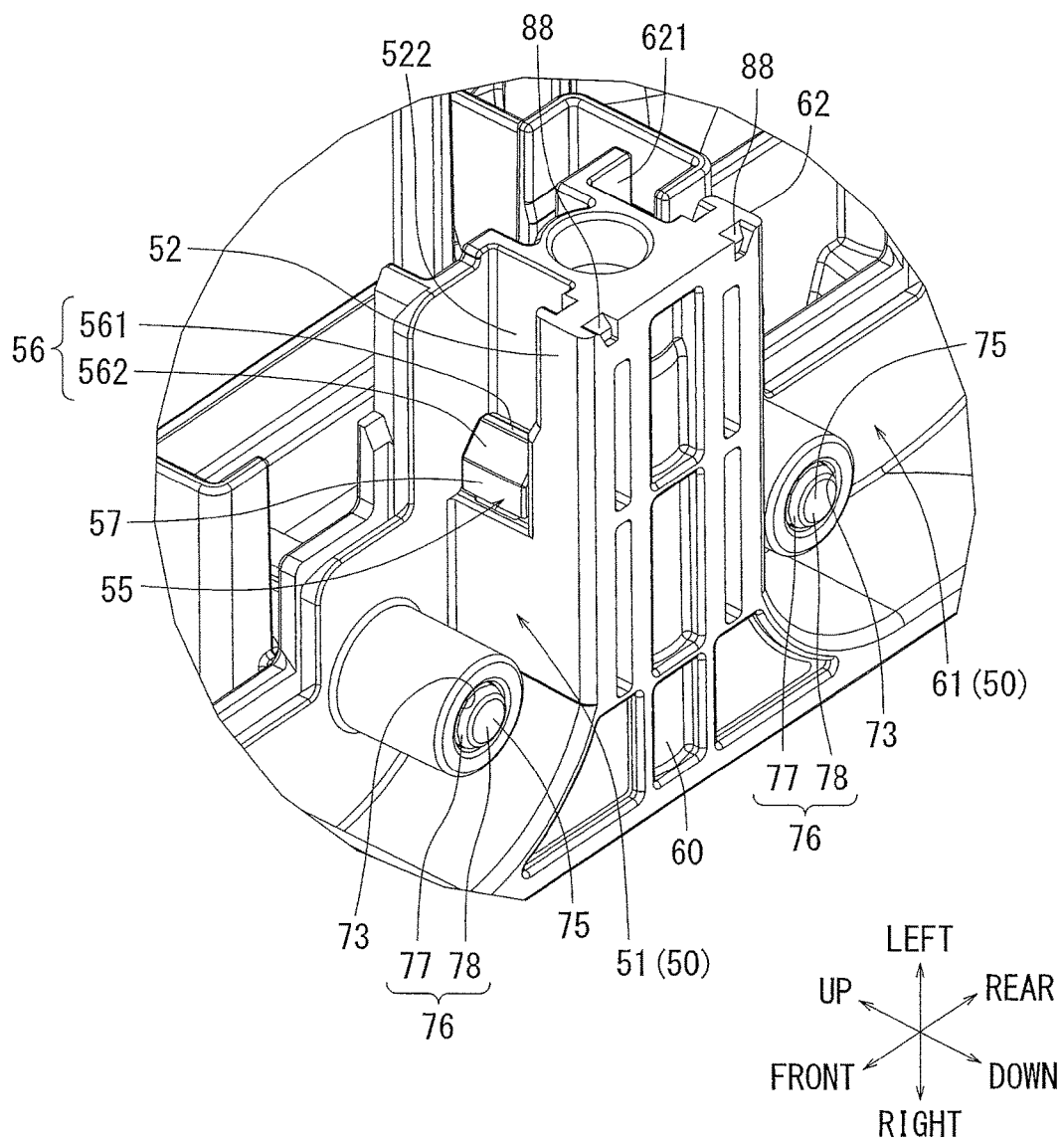
FIG. 12 is an enlarged perspective view of the interior of guide groove portions of the battery mount portion as seen from below.
Figure 13:
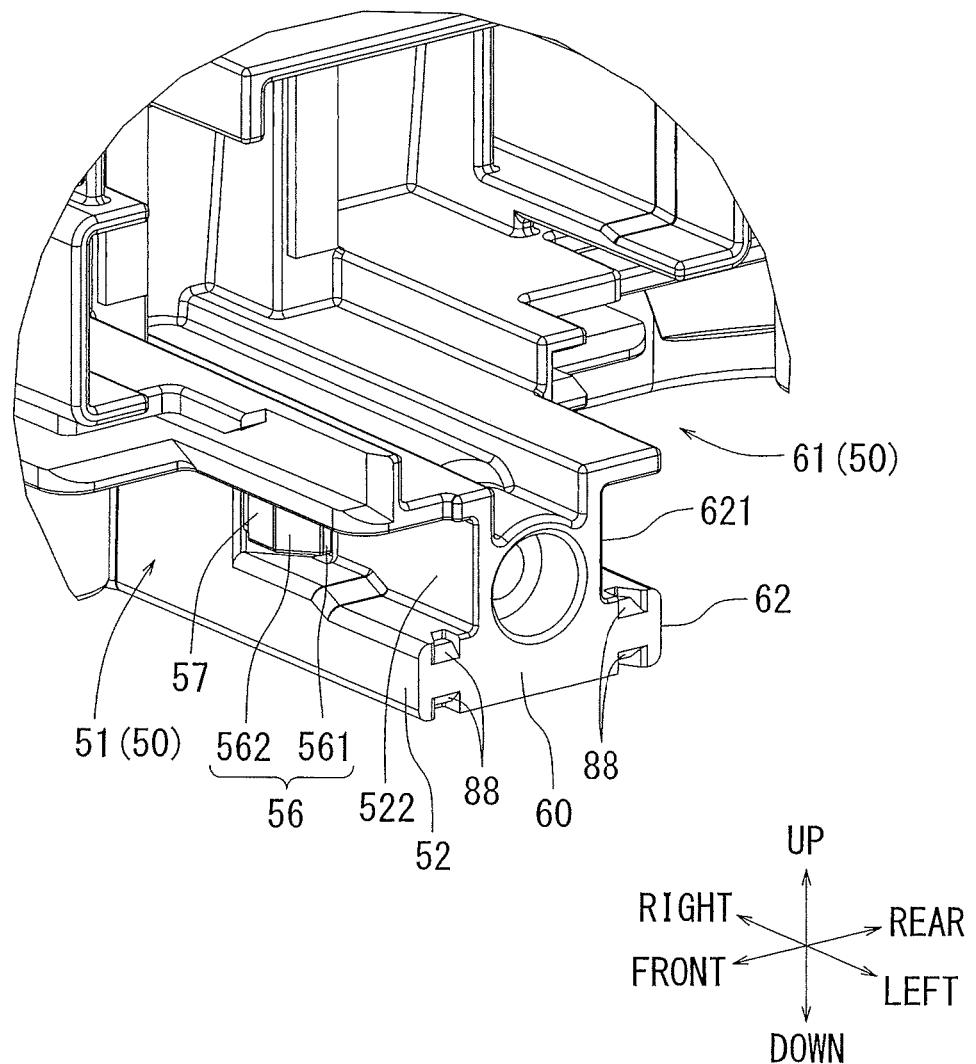
FIG. 13 is an enlarged perspective view of the interior of the guide groove portions as seen from above.
Figure 14:
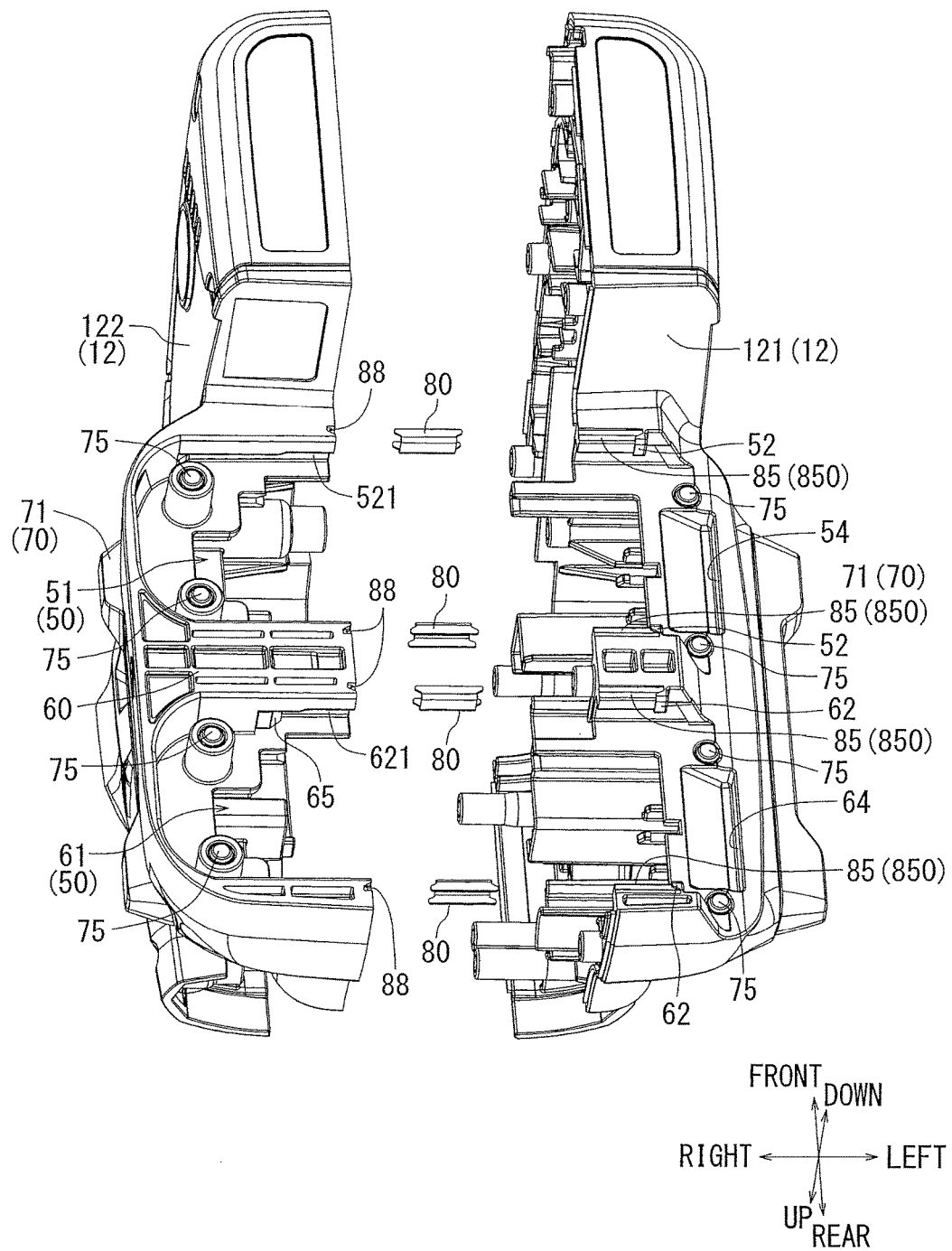
FIG. 14 is an exploded perspective view of a main body housing and reinforcing members of the hammer drill.

More specifically, as shown in FIG. 11, each of the battery mount portions 50 may have retaining recesses 73 (one retaining recess 73 is shown in FIG. 11). The pin-shaped members 75 may be molded from synthetic rubber exhibiting elasticity and may be fitted into the retaining recesses 73. The length of the pin-shaped members 75 may be set such that when fitted into the retaining recesses 73, the pin-shaped members 75 protrude slightly downwardly from the retaining recesses 73. Thus, an exposed end 76 of the pin-shaped member 75 fitted into each of the retaining recesses 73 may be exposed so as to protrude slightly outwardly. At the end edge of the exposed end 76, there is provided an appropriately chamfered portion 77. As a result, due to the chamfered portion 77 of the pin-shaped member 75, the rechargeable battery 90 mounted through sliding can smoothly get over the pin-shaped member 75 to attain the attachment complete state. Further, the external end surface of the exposed end 76 may be formed as a flat contact end surface 78. As a result, the rechargeable battery 90 attached to the corresponding battery mount portion 50 may contact the contact end surfaces 78 of the pin-shaped members 75. Here, the contact end surfaces 78 of the pin-shaped members 75 may be slightly pressed against the upper surface of the rechargeable battery 90 attached to the battery mount portion 50. This occurs while the contact end surfaces 78 contact the upper surface of the rechargeable battery in surface-to-surface contact relationship.

The retaining recesses 73 and the pin-shaped members 75 fitted into the retaining recesses 73 may be provided at four positions. These four positions are located near the corner positions and are symmetrical with respect to the center axis of the rechargeable battery 90. The rechargeable battery 90 is attached to the corresponding battery mount portion 50. Thus, the pressures of the pin-shaped members 75 applied to the rechargeable battery 90 attached to the battery mount portion 50 may be well-balanced, making it possible to suppress, in a well-balanced manner, the rattling of the rechargeable battery 90 attached to the battery mount portion 50.

The front battery contact portion 55 and the rear battery contact portion 65 configured as described above may function as follows. In describing the contact action against the rechargeable batteries 90, the description will be focused on the front battery contact portion 55, and the rear battery contact portion 65 will be simply referred to through the attachment of pertinent reference numerals in parentheses. As the rechargeable battery 90 to be mounted slides, the guide projection portion of the rechargeable battery 90 may contact the front battery contact portion 55 (65). More specifically, the end in the sliding direction of the guide projection portion of the rechargeable battery 90 may contact the contact front end portion 56 (66) having the front end facing portion 561 (661) and the front end inclined surface end portion 562 (662). During this process, due to the elasticity of the contact front end portion 56 (66), the contact of the guide projection portion sliding can be buffered. Next, as the rechargeable battery 90 slides for mounting, it is possible to guide the guide projection portion of the rechargeable battery 90 along the inclination of the front end inclined surface 562 (662). That is, the front end inclined surface portion 562 (662) may act so as to press the sliding guide projection portion toward the inner side of the battery mount portion 50. In this process, the front end inclined surface portion 562 (662) may act so as to buffer the contact force of the sliding guide projection portion using the elasticity of the front end inclined surface portion 562 (662). When the sliding is completed, the rechargeable battery 90 mounted to the battery mount portion 50 can be elastically supported by the pressure flat portion 57 (67). That is, the pressure flat portion 57 (67) provides elastic support so as to press the guide projection portion of the rechargeable battery 90 from the guide groove portion 522 (621) provided with the front battery contact portion 55 (65) toward the guide groove portion 521 (622) opposed thereto. That is, the pressure flat portion 57 (67) contacts and applies an urging force to the guide projection portion of the rechargeable battery 90 in the front and rear directions. These directions are the reciprocating direction of the hammer bit B.

The guide groove portions 521 and 522 of the front side battery mount portion 51 may be respectively provided with rail portions 52 and 62. The guide groove portions 621 and 622 of the rear side battery mount portion 61 may also be respectively provided with rail portions 52 and 62. A reinforcing member 80 having a high wear resistance against the sliding movement of the rechargeable battery 90 may be attached to each of the rail portions 52 and 62. More specifically, two reinforcing members 80 may be respectively attached to the pair of rail portions 52 forming the guide groove portions 521 and 522 of the front side battery mount portion 51. Similarly, two reinforcing members 80 may be connected to the pair of rail portions 62 so as to form the guide groove portions 621 and 622 of the rear side battery mount portion 61. The reinforcing members 80 may be formed of molded metal plates, while the rail portions 52 and 62 may be made of plastic resin. The reinforcing members 80 molded from metal may be superior to the plastic resin forming the rail portions 52 and 62 in terms of wear resistance. Thus, it is possible to inhibit wear of the rail portions 52 and 62 due to the sliding of the rechargeable battery 90 when mounting and removing the rechargeable battery 90. In this way, the rail portions 52 and 62 to which the reinforcing members 80 are attached may serve as portions of the guide groove portions 521 and 522. They may be brought into sliding contact with the guide projection portions.

The weight of the rechargeable batteries 90 may be applied to the rail portions 52 and 62. Therefore, the rechargeable batteries 90 may slidably contact the rail portions 52 and 62 while the weight of the rechargeable batteries 90 is applied to the rail portions 52 and 62. Hence, the portions where the reinforcing members 80 are attached may be set to be on the lower sides in the gravitational direction of the guide groove portions 521, 522, 621, and 622.

The attaching positions of the reinforcing members 80 may be set to be near the insertion open ends of the guide groove portions 521, 522, 621, and 622, through which the guide projection portions are fitted. That is, the assembling portions of the reinforcing members 80 may be portions of the rail portions 52 and 62. They are most subject to the sliding friction from the guide projection portions when the rechargeable batteries 90 are mounted to and from the battery mount portions 50. The reinforcement by the reinforcing members 80 may contribute to securely guide the sliding of the rechargeable batteries 90 at the guide groove portions 521, 522, 621, and 622.

Figure 15:
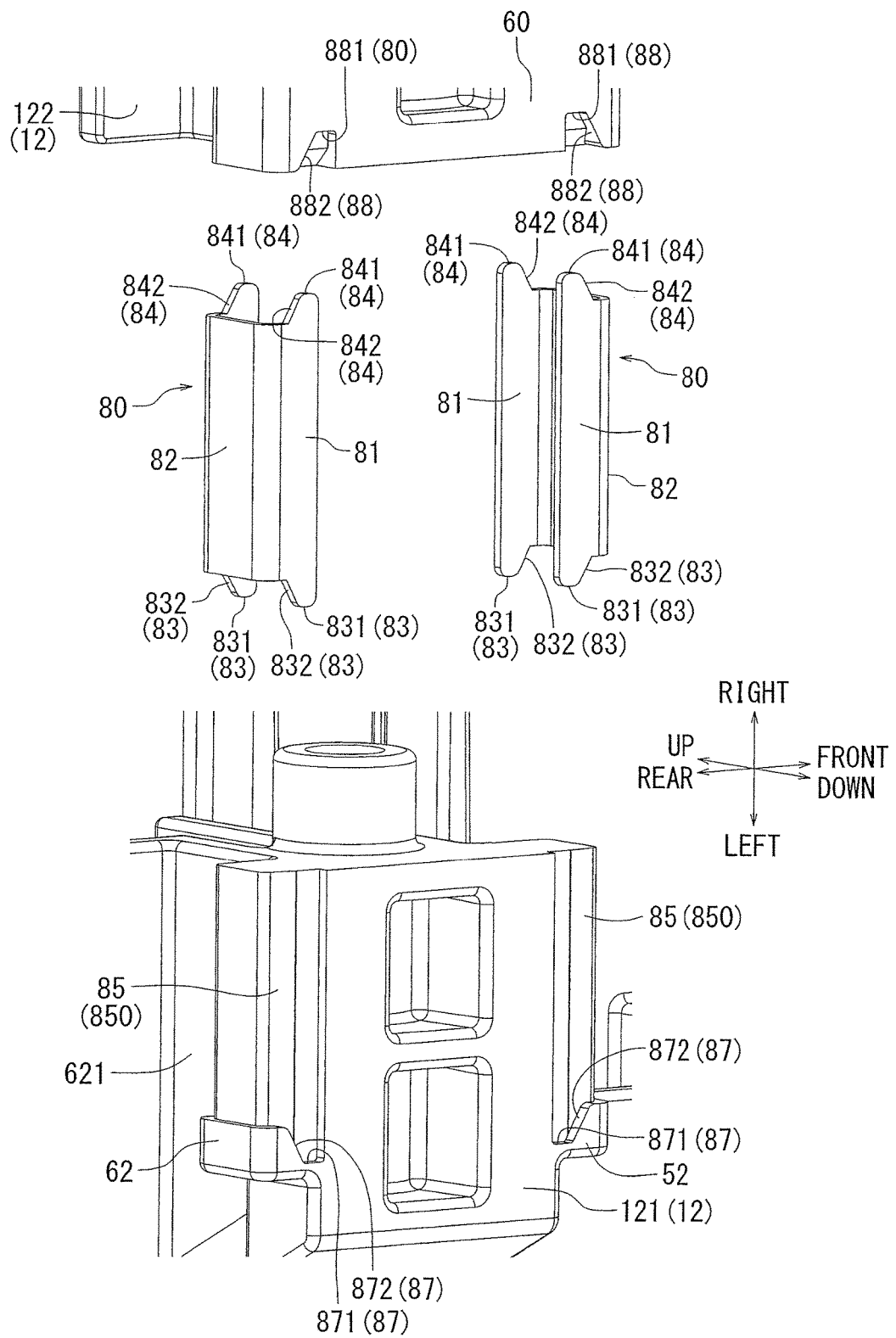
FIG. 15 is an enlarged exploded perspective view of the reinforcing members and portions where the reinforcing members are assembled.
Figure 16:
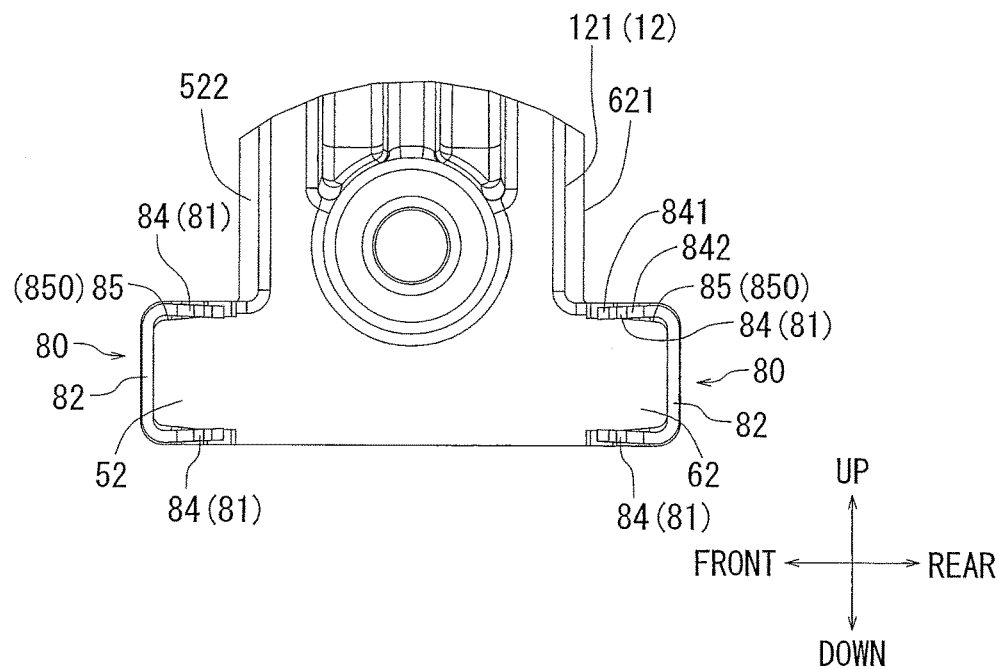
FIG. 16 is a front view illustrating the reinforcing members mounted to a left-hand side housing of the main body housing.
Figure 17:
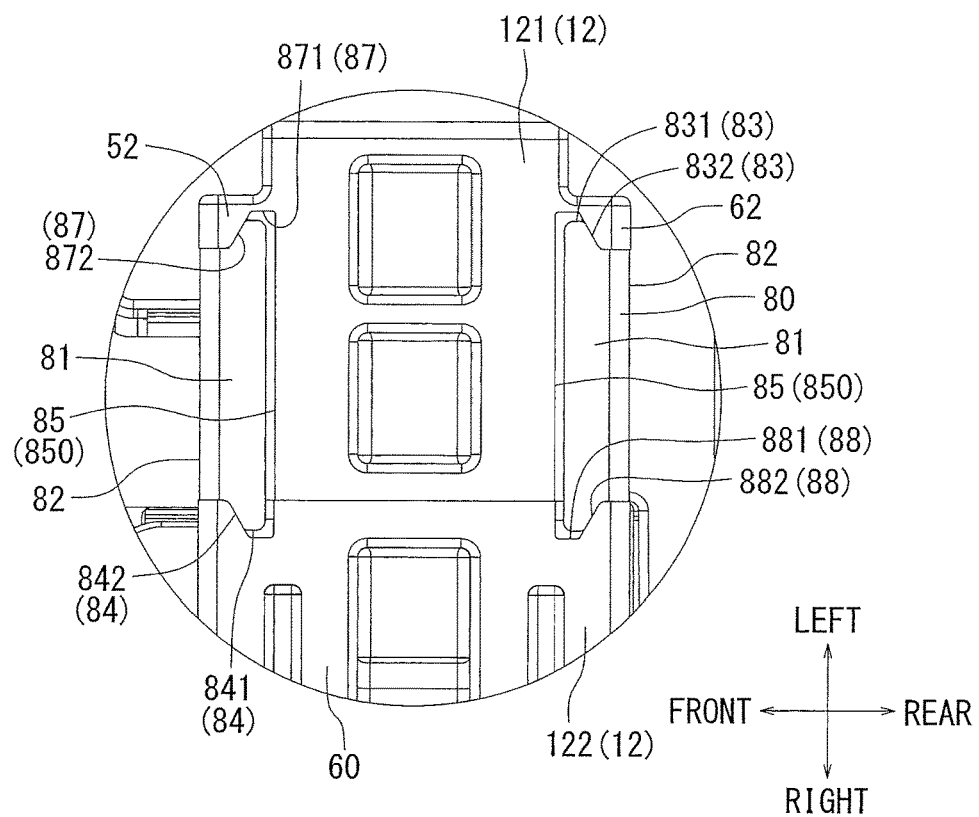
FIG. 17 is an enlarged front view of a portion indicated by XVII of FIG. 7, where the reinforcing members are assembled at the point where the left-hand side housing and the right-hand side housing are joined together.

Further, the rail portions 52 and 62 may be of male configurations configured to be fitted into the recessed configurations of the rechargeable batteries 90 using the guide projection portions. Therefore, it is likely that the rail portions 52 and 62 are rubbed against the portions of the rechargeable batteries 90 near the guide projection portions. To this end, the reinforcing members 80 may be formed to have configurations covering the guide groove portions 521, 522, 621, and 622, and surrounding three sides thereof as seen in the sliding direction. More specifically, the reinforcing members 80 may be attached to the rail portions 52 and 62 such that the lower surfaces of the guide groove portions 521, 522, 621, and 622 are positioned over the rail portions 52 and 62. Further, as shown in FIG. 15, the reinforcing members 80 may be attached to the left-hand side half housing 121 and the right-hand side half housing 122. More specifically, assembling recesses 850 allowing the assembling of the reinforcing members 80 may be provided in the left-hand side half housing 121 and the right-hand side half housing 122. Each of the assembling recesses 850 may have a configuration corresponding to the configuration of each of the reinforcing members 80. Further, as shown in FIGS. 15 and 16, each of the reinforcing members 80 may be formed in a U-shaped configuration surrounding the three sides of the upper side, lower side, and inner side (inner side of the battery mount portion 50) as seen in the sliding direction of the corresponding rechargeable battery 90. More specifically, the U-shaped configuration of the reinforcing member 80 may include two opposing walls 81 vertically opposing each other, and a connection wall 82 connecting the side edges of the opposing walls 81. As shown in FIG. 16, the opposing walls 81 arranged to vertically oppose each other may be slightly inclined such that the distance between the disconnected side edges (on the outer side with respect to the battery mount portion 50) is smaller than the distance between the connected side edges connected by the connection wall 82. Therefore, by simply fitting the reinforcing member 80 into the assembling recess 850 (fitting recess 85), the non-connection side edges on the side opposite the side edges connected by the connection wall 82 may clamp the assembling recess 850 (fitting recess 85) therebetween so as to be held at the assembling recess 850.

Further, each of the reinforcing members 80 may be provided with engaging portions 83 and 84 at opposite ends of the opposing walls 81. In other words, the engaging portions 83 and 84 may be provided at opposite ends respectively facing the left-hand side half housing 121 and the right-hand side half housing 122. The engaging portions 83 and 84 may be formed so as to prevent detachment of the reinforcing member 80 after the left-hand side half housing 121 and the right-hand side half housing 122 have been joined to form the battery mount portion 50. The engaging portions 83 and 84 may be configured to respectively frictionally engage the assembling recesses 850 of the rail portions 52 and 62. The rail portions 52 and 62 constitute the guide groove portions 521, 522, 621 and 622 so as to prevent detachment of the reinforcing member 80.

More specifically, as shown in FIG. 15, the engaging portions 83 may be provided at the left-hand end of the reinforcing member 80 on the side facing the left-hand side half housing 121, and the engaging portions 84 may be provided at the right-hand end of the reinforcing member 80 on the side facing the right-hand side half housing 122. The left-hand side engaging portions 83 and the right-hand side engaging portions 84 may be formed so as to be symmetrical relative to each other. Each of the left-hand side engaging portions 83 and the right-hand side engaging portions 84 may have a configuration tapered toward the terminal end. The left-hand side engaging portions 83 and the right-hand side lock portions 84 may be respectively provided with protruding ends 831 and 841 to be engaged, and may be further respectively provided with guide outer edge portions 832 and 842 guided during the assembling operation. The outer edges with respect to the battery mount portion 50 of the protruding ends 831 and 841 may be connected with the side edges on the non-connection sides (the outer side of the battery mount portion 50) of the opposing walls 81. On the other hand, on the opposite side (the inner side of the battery mount portion 50) of the outer edges, there are provided the guide outer edge portions 832 and 842. The guide outer edge portions 832 and 842 may be inclined toward the non-connection side of the opposing walls 81 (the outer side of the battery mount portion 50) as they extend toward their ends. That is, the guide outer edge portions 832 and 842 may be inclined toward the outer side of the battery mount portion 50 with respect to the joining direction of the left-hand side half housing 121 and the right-hand side half housing 122. The guide outer edge portions 832 and 842 thus formed may be fitted into engaging recesses 87 and 88 at opposite side edges of the corresponding assembling recess 850, and may restrict detachment of the reinforcing member 80 from the assembling recess 850.

The assembling recesses 850 to which the reinforcing members 80 are assembled may be formed to conform to the configurations of the reinforcing members 80. That is, as shown in FIG. 16, the assembling recesses 850 may be formed in a recessed configuration such that the reinforcing members 80 attached thereto are flush with the corresponding rail portions 52 and 62. More specifically, each of the assembling recesses 850 may include a fitting recess 85 and engaging recesses 87 and 88. The fitting recess 85 may be formed in a recessed configuration into which the opposing walls 81 and the connection wall 82 of the reinforcing member 80 having a U-shaped configuration are fitted so as to exhibit an outer peripheral surface flush with the rail portions 52 (62).

The fitting recess 85 may be a U-shaped recess having three sides, i.e., the upper side, the lower side, and the inner side (the inner side of the battery mount portion 50). The fitting recesses 85 may be provided solely in the left-hand side half housing 121 having the rail portions 52 but may not be provided in the right-hand side half housing 122 having the rail portions 62. Further, the engaging recesses 87 and 88 are also formed in a recessed configuration into which the left-hand side engaging portion 83 and the right-hand side engaging portion 84 are respectively fitted so as to exhibit an outer peripheral surface flush with the rail portions 52 (62). The engaging recesses 87 and 88 may be provided in both the left-hand side half housing 121 and the right-hand side half housing 122 forming the rail portions 52 and 62.

Each of the engaging recesses 87 may be provided with an engaging recess 871 corresponding to a protruding end 831 for engaging the left-hand side engaging portion 83 and may be further provided with a guide groove wall 872 configured to guide the guide outer edge portion 831. Similarly, each of the engaging recesses 88 may be provided with an engaging recess 881 corresponding to protruding end 841 for engaging the right-hand side engaging portion 84 and may be further provided with a guide groove wall 882 configured to guide the guide outer edge portions 841. When the guide outer edge portions 832 and 842 of the engaging portions 83 and 84 contact the guide groove walls 872 and 882, the protruding ends 831 and 841 may be urged to be fitted into the engaging recesses 87 and 88 due to the components in the left and right direction of the applied forces. That is, an urging force may be applied to each of the reinforcing members 80 such that the reinforcing members 80 are correctly positioned in correspondence with the recessed configurations of the assembling recesses 850. Further, the urging forces applied to the reinforcing members 80 may also act as forces for preventing detachment of the reinforcing members 80 with respect to the assembling recesses 850.

For connecting the reinforcing members 80 with the assembling recesses 850, the reinforcing members 80 may be first fitted into the fitting recesses 85 of the left-hand side half housing 121 when it is separated from the right-hand side half housing 122. In this process, the opposing walls 81 of each of the reinforcing members 80 may act on the corresponding fitting recess 85 of the left-hand side half housing 121 such that each of the reinforcing members 80 can be temporarily held against the fitting recess 85. When the left-hand side half housing 121 and the right-hand side half housing 122 are joined together, the guide outer edge portions 832 and 842 of the engaging portions 83 and 84 may contact the guide groove walls 872 and 882, and the protruding ends 831 and 841 may be fitted into the engaging recesses 87 and 88. As a result, each of the reinforcing members 80 can be automatically positioned to correspond to the recessed configuration of the assembling recess 850. In this way, by simply connecting the left-hand side half housing 121 and the right-hand side half housing 122 to each other, it is possible to reliably assemble the reinforcing members 80 at suitable positions relative to the guide groove portions 521, 522, 621, and 622.

As described above, the reinforcing members 80 can be connected to the assembling recesses 850 while exhibiting an assembling state holding force and a detachment prevention force (i.e. a frictional engaging force). Therefore, after the joining of the left-hand side half housing 121 and the right-hand side half housing 122 has been released to separate the left-hand side half housing 121 and the right-hand side half housing 122 from each other, it is possible to detach the reinforcing members 80 from the guide groove portions 521, 522, 621, and 622.

The advantages of the hammer drill 10 will now be described. The battery contact portions 55 and 65 of the hammer drill 10 can apply an urging force to the rechargeable batteries 90 mounted to the battery mount portions 50 (51, 61) in the reciprocating direction of the hammer bit B (tip tool). As a result, it is possible to inhibit relative movement of the rechargeable batteries 90 with respect to the battery mount portions 50 (51, 61) in the reciprocating direction of the hammer bit B. Thus, it is possible to further eliminate the rattling of the rechargeable batteries 90 which may be subject to vibrations in the reciprocating direction of the hammer bit B. In this way it is possible to sufficiently eliminate the rattling of the rechargeable batteries 90 attached to the battery mount portions 50 (51, 61). Further, in the above-described hammer drill 10, the battery contact portions 55 and 65 are formed by introducing the molding material (elastomeric material) on the outer side of the main body housing 12 to get around to the inner side of the main body housing 12, so that they can be molded by a single molding process using the same molding material. As a result, it is possible to suppress an increase in the number of materials at the time of molding while sufficiently eliminating the rattling of the rechargeable batteries 90. This is advantageous from the viewpoint of facilitating the manufacturing operation, a reduction in production cost, etc. Further, in the above-described hammer drill 10, the battery contact portions 55 and 65 have contact front end portions 56 and 66 configured to contact the rechargeable batteries 90 in the left and right direction and the front and rear directions. The contact front end portions 56 and 66 contact the rechargeable batteries 90 during mounting of the rechargeable batteries 90 to the battery mount portions 50 in the left and right directions as well as the front and rear direction, thereby suppressing rattling. Thus, it is possible to mount the rechargeable batteries 90 in a more stable manner, making it possible to mount the rechargeable batteries 90 to the battery mount portions 50 (51, 61) more securely. Further, in the above-described hammer drill 10, there are provided pin-shaped members 75 contacting the mounted rechargeable battery 90 in the vertical direction, which crosses the left and right direction and the front and rear direction. In this way it is possible to support the mounted rechargeable battery 90, together with the contact front end portions 56 and 66, through contact in the left and right directions, the front and rear direction, and the vertical direction. As a result, it is possible to eliminate the rattling of the rechargeable batteries 90 in the three different directions crossing each other. In this way it is possible to eliminate to a sufficient degree the rattling of the rechargeable batteries 90 attached to the battery mount portions 50 (51, 61).

Further, in the above-described hammer drill 10, the battery contact portions 55 and 65 are respectively provided at the guide groove portions 521 and 522 and the guide groove portions 621 and 622. The guide groove portions 521, 522, 621, and 622 are formed in a female configuration corresponding to the guide projection portions of the rechargeable batteries 90, so that they can be brought into sliding contact with the guide projection portions so as to surround them. As a result, it is possible to efficiently eliminate the rattling in a multiplicity of directions of the rechargeable batteries 90 mounted to the battery mount portions 50 (51, 61). Further, in the above-described hammer drill 10, the molding material described above can also integrally mold the urging damper portions 48 so they may support the controller 47 inside the main body housing 12. In this way it is possible to further support the controller 47 through the molding of the same molding material. As a result, it is possible to maintain a low number of materials for molding for supporting the controller 47 while sufficiently eliminating the rattling of the above-mentioned rechargeable batteries 90. This is advantageous from the viewpoint of simplification of the manufacturing operation, a reduction in production cost, etc. Further, in the above-described hammer drill 10, there are provided a plurality of battery mount portions 50 (51, 61), whereby it is possible to attach a plurality of rechargeable batteries 90. This helps to provide a reciprocating tool capable of enhancing the capacity regarding power supply. For example, it is possible to increase the capacity of the supply power to enable long-term use, and to enable enhance the voltage of the supply power to allow the utilization of high power output, thus enlarging the range of application of the electric tool. Further, in the above-described hammer drill 10, the sliding direction in which the rechargeable batteries 90 are moved relative to the battery mount portions 50 (51, 61) is set to be the left and right directions crossing the reciprocating direction of the tool holder 37. In this way, it is possible to reduce the size in the reciprocating direction of the rechargeable battery 90. This helps to provide a reciprocating tool reduced in size in the reciprocating direction.

In the above-described hammer drill 10, the reinforcing members 80 can be attached where the left-hand side half housing 121 and the right-hand side half housing 122 face each other. As a result, it is possible to assemble the reinforcing members 80 simultaneously with the joining of the left-hand side half housing 121 and the right-hand side half housing 122. Here, each of the reinforcing members 80 is provided with the engaging portions 83 and 84, so that when the left-hand side half housing 121 and the right-hand side half housing 122 are joined together to form the battery mount portions 50 (51, 61), it is possible to prevent detachment of the reinforcing members 80 from the guide groove portions 521, 522, 621, and 622. This makes it possible to lock the reinforcing members 80 at the portions to which they have been attached. In this way, through the joining of the left-hand side half housing 121 and the right-hand side half housing 122, it is possible to prevent detachment of the assembled reinforcing members 80 from the portions to which they have been assembled. Further, in the above-described hammer drill 10, the engaging portions 83 and 84 are provided with the guide outer edge portions 832 and 842, so that it is possible to guide the reinforcing member 80 such that the reinforcing member 80 is situated at the assembled position through the joining of the left-hand side half housing 121 and the right-hand side half housing 122. As a result, assembling of the reinforcing members 80 can be effected automatically as the left-hand side half housing 121 and the right-hand side half housing 122 are joined together. Thus, it is possible to enhance the convenience in connection with the operation of assembling the reinforcing members 80.

Further, in the above-described hammer drill 10, each of the reinforcing members 80 is of a U-shaped configuration having three sides: the upper side, the lower side, and the inner side as seen in the sliding direction. It is therefore possible to effect reinforcement by the reinforcing member 80 with respect to the three directions of the upward, the downward, and the inward directions crossing the sliding direction. As a result, it is possible to efficiently reinforce the sliding contact surfaces facing in different directions by a single member. Further, in the above-described hammer drill 10, the engaging portions 83 and 84 are respectively provided on opposing walls 81 constituting the two opposing surfaces of the U-shaped reinforcing member 80, so that it is possible to effect locking by the engaging portions 83 and 84 in a well-balanced manner. As a result, it is possible to more securely prevent the detachment of the reinforcing members 80 by their engaging portions 83 and 84. Further, in the above-described hammer drill 10, the attaching positions of the reinforcing members 80 are set near the insertion port ends of the guide groove portions 521, 522, 621, and 622. It is here that the guide projection portions are fitted, so that it is possible to intensively reinforce the portions near the insertion port ends of the guide groove portions 521, 522, 621, and 622, which are more subject to wear. Further, in the above-described hammer drill 10, as the left-hand side half housing 121 and the right-hand side half housing 122 are separated from each other, the reinforcing members 80 may be removed with respect to the portions where the guide groove portions 521, 522, 621, and 622 are provided. Therefore, the reinforcing members 80 can be easily replaced with other reinforcing members. Further, when the hammer drill 10 is to be disposed of, it is possible to easily do so by removing the reinforcing members 80.

Figure 18:
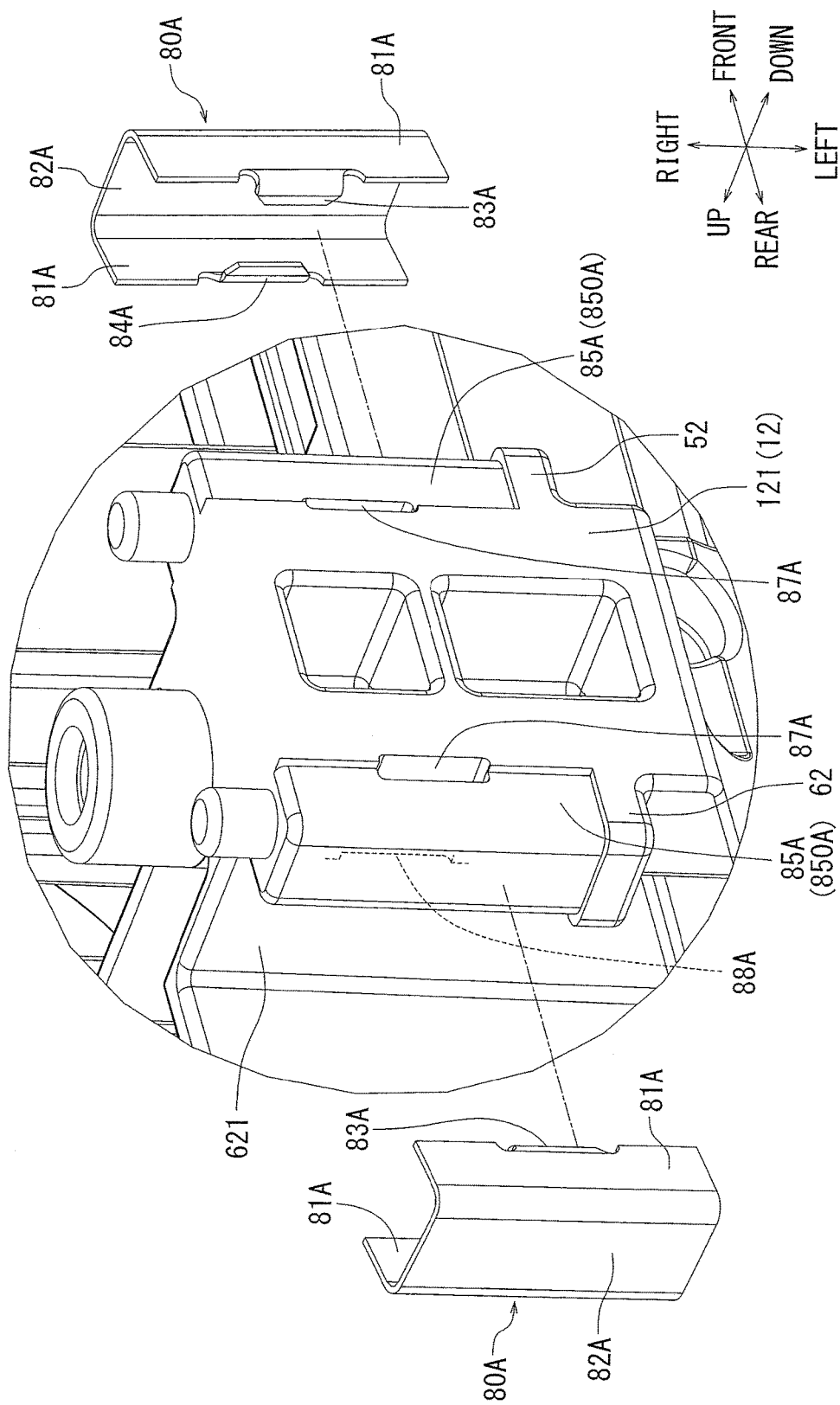
FIG. 18 is an enlarged perspective view of reinforcing members according to another embodiment.
Figure 19:
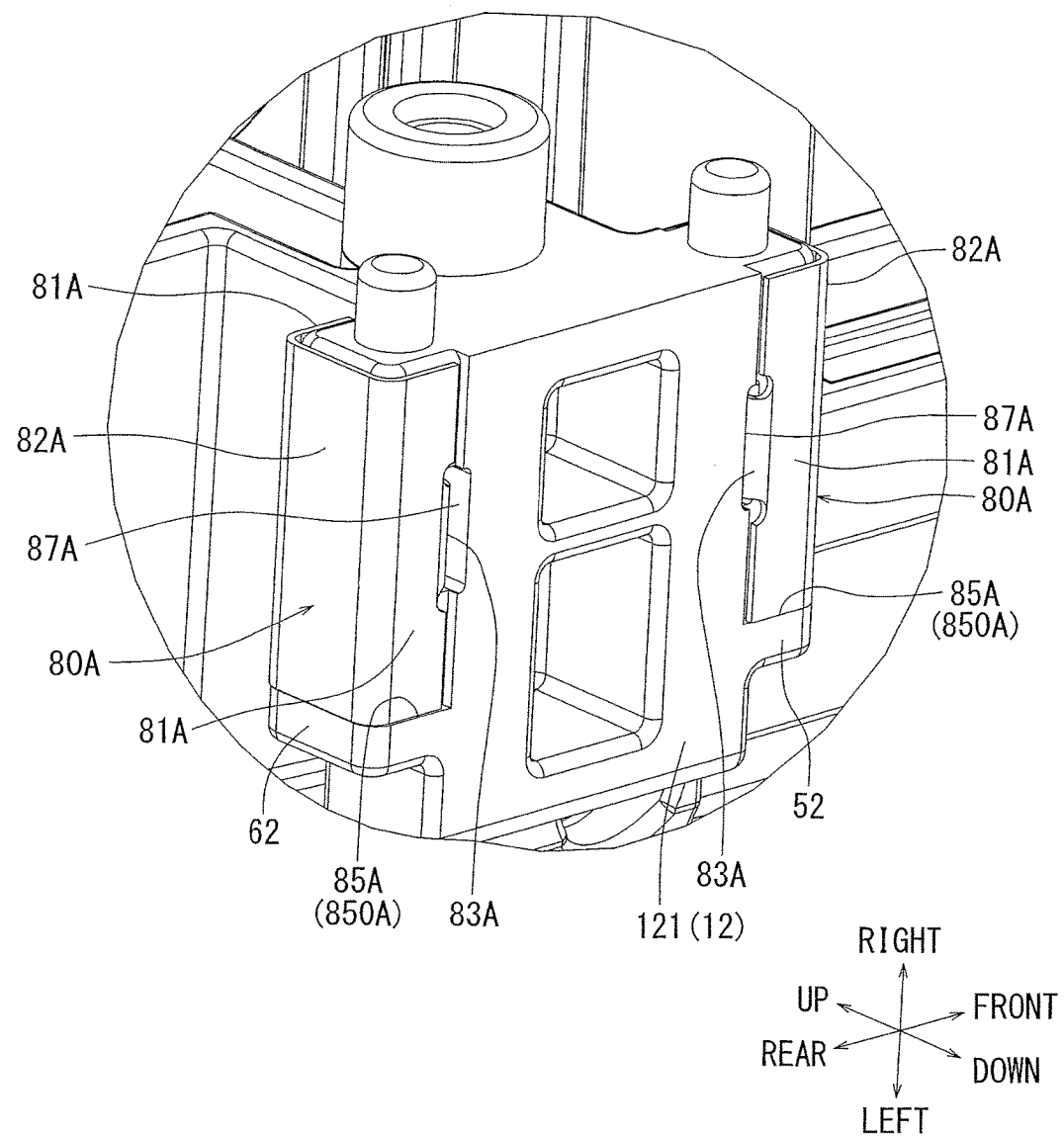
FIG. 19 is a perspective view illustrating the reinforcing members of FIG. 18 assembled to the left-hand side housing.

The above-described reinforcing members 80 may be modified as follows. In FIGS. 18 and 19, numeral 80A indicates modified reinforcing members. FIG. 18 is an enlarged perspective view showing the reinforcing members 80A according to the modification. FIG. 19 shows a perspective view illustrating the reinforcing members 80A after connecting them to the left-hand side half housing 121. These reinforcing members 80A may be different from the above reinforcing members 80 in the lock construction with respect to their assembling recesses 850A. Thus, the portions of the same function as those of the above-described embodiment are indicated by numerals with the letter "A" affixed at their ends, and a description thereof will be omitted.

Each of the reinforcing members 80A shown in FIGS. 18 and 19 may be provided with lock claw portions 83A and 84A in place of the engaging portions 83 and 84 of the reinforcing member 80. The lock claw portions 83A and 84A may be respectively fitted with fit-engagement recesses 87A and 88A provided in the assembling recess 850A. The fit-engagement of the lock claw portions 83A and 84A with the fit-engagement recesses 87A and 88A may be effected through elastic deformation of opposing walls 81A and a connection wall 82A of the reinforcing member 80A. When the reinforcing members 80A have been attached to the assembling recesses 850A, the lock claw portions 83A and 84A of each reinforcing member 80A are fit-engaged with the fit-engagement recesses 87A and 88A. In this way, even after the left-hand side half housing 121 and the right-hand side half housing 122 have been separated from each other, the reinforcing members 80A may be less subject to detachment from the assembling recess 850A. Because the reinforcing members 80 (80A) are attached to both of the pair of rail portions, i.e., the rail portion 52 of the front side battery mount portion 51 and the rail portion 62 of the rear side battery mount portion 61, it is possible to enhance the strength of the guide groove portions 521, 522, 621, and 622 constituting the battery mount portions 50 with respect to the attachment and detachment of the rechargeable batteries 90.

In some of the above embodiments, the hammer drill 10 has been given as an example of an electric tool and of a reciprocating tool. However, the above teachings can be applied to any other electric tools using electric motors as drive sources. For example, applicable electric tools may be an electric screwdriver, an electric drill, an electric driver drill or the like and also may be a cleaner, a disk sander, a polisher or the like. Further, applicable reciprocating tools may not be limited to those having the same construction as the hammer drill 10 of the above-described embodiment and may be any other reciprocating tools, such as a reciprocating saw. It is preferred that they have a reciprocating movement mechanism that can reciprocally drive a tool output portion to which an end tool is attached.

Further, regarding the elastomeric material of the above embodiments, the material is not limited to elastomer and may be selected from various materials having elasticity. Further, it is not always indispensable that the material forming the battery contact portions should be the same material as that commonly used for the bumper portion 71, the urging damper portion 48, etc.

Further, regarding the battery contact portions, they may not be limited to the battery contact portions 55 and 65 of the above embodiments and may be provided in a large number, for example, in pairs opposing each other.

Further, regarding the reinforcing members, they may not be limited to the reinforcing members 80 or 80A of the above embodiments. Any other reinforcing members can be used as long as they are each provided with a connecting structure to be connected to a portion where the reinforcing member is assembled for inhibiting detachment of the reinforcing member from the guide groove portion. Thus, the reinforcing members may have any other configurations as long as they are each provided with such a connecting structure. Similarly, regarding the configuration of the guide outer edge portions, it is possible to select a configuration as appropriate.

The reinforcing members are not limited to the reinforcing members 80 or 80A of the above embodiments. It may be modified in length, size, and number from the reinforcing members 80 and 80A as appropriate. It is preferable that the reinforcing members be provided at portions with which the rechargeable batteries are brought into sliding contact. The portions to be brought into sliding contact are not limited to the rail portions.

Further, the main body housing 12 may be formed by joining together the left-hand side half housing 121 and the right-hand side half housing 122 which are separately molded. However, the left-hand side half housing 121 and the right-hand side half housing 122 are not necessarily molded members. For example, the left-hand side half housing 121 and the right-hand side half housing 122 may be formed by machining operations. Furthermore, the reinforcing members (in particular the reinforcing members 80A shown in FIGS. 18 and 19) may be applied to a main body housing that is a single member.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric tools, and methods of making and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:
1. An electric tool comprising:
   a battery mount portion configured such that a rechargeable battery can be mounted to the battery mount portion as the rechargeable battery is slid along the battery mount portion; and
   a drive device configured to be driven with a supply of electrical power from the rechargeable battery, wherein:
   the battery mount portion comprises a first molded member and a second molded member divided so as to be respectively located on a front side and a rear side with respect to a sliding direction of the rechargeable battery along the battery mount portion, the first molded member and the second molded member being joined together to form the battery mount portion;
   the battery mount portion further comprises a guide groove structure configured to fit with a guide projection structure of the rechargeable battery in the sliding direction so as to guide the rechargeable battery to move in the sliding direction when the rechargeable battery is mounted to the battery mount portion;
   the electric tool further comprises a reinforcing member attached to the guide groove structure of the battery mount portion so as to cover a slide contact part of the guide groove structure where the guide projection structure slidably contacts the guide groove structure;
   the reinforcing member is connected to the guide groove structure as the reinforcing member is moved toward opposing portions of the first molded member and the second molded member before the first molded member and the second molded member are joined to each other;

the reinforcing member includes an engaging structure that is engaged with portions of the first molded member and the second molded member, where the reinforcing member is connected, so as to inhibit removal of the reinforcing member from the guide groove structure when the first molded member and the second molded member are joined together to form the battery mount portion.

2. The electric tool according to claim 1, wherein the reinforcing member has a substantially U-shape as viewed in the sliding direction and has three sides extending in three different directions.

3. The electric tool according to claim 2, wherein the engaging structure includes a first engaging structure and a second engaging structure respectively provided on two of three sides of the reinforcing member such that they are opposing each other.

4. The electric tool according to claim 1, wherein the engaging structure includes at least one guide outer edge portion inclined relative to a joining direction of the first molded member and the second molded member and configured to guide the reinforcing member such that the reinforcing member is brought to a position to be connected as the first molded member and the second molded member are joined together.

5. The electric tool according to claim 1, wherein the reinforcing member is attached to a position proximal to an insertion opening end of the guide groove structure, wherein the guide projection structure is fitted into the guide groove structure starting from the insertion opening end.

6. The electric tool according to claim 1, wherein when the first molded member and the second molded member are separated from each other, the reinforcing member is detachable from a portion of the guide groove structure.

7. The electric tool according to claim 1, wherein:
the battery mount portion comprises a plurality of battery mount portions each including the guide groove structure;
the reinforcing member comprises a plurality of reinforcing members;
the plurality of reinforcing members are attached to the guide groove structures of the plurality of battery mount portions.

8. The electric tool according to claim 1, wherein:
the drive device is configured to reciprocally move a working tool;
the electric tool further includes a battery contact portion;
the battery contact portion is molded from an elastomeric material so as to be integrated with the battery mount portion and configured to contact the rechargeable battery when the rechargeable battery is mounted to the battery mount portion; and
the battery contact portion urges the rechargeable battery in a direction parallel to a reciprocating direction of the working tool.

9. An electric tool comprising:
a battery mount portion having a guide groove structure configured to be slidably fitted with a guide projection structure of a rechargeable battery; and
a reinforcing member configured to be attached to the guide groove structure of the battery mount portion and including a connecting structure detachably connecting the reinforcing member to the guide groove structure, wherein the reinforcing member is made of metal plates and slidably contacts the guide projection structure when the guide projection structure is fitted with the guide groove structure.

10. The electric tool according claim 9, wherein:
the battery mount portion comprises a first member and a second member joined together to form the battery mount portion; and
the connecting structure comprises an engaging structure configured to be engaged with the first member or the second member.

11. The electric tool according to claim 10, wherein:
the engaging structure comprises a first engaging portion and a second engaging portion;
the first engaging portion frictionally engages the first member in a first direction along a sliding direction of the rechargeable battery; and
the second engaging portion frictionally engages the second member in a second direction opposite the first direction.

12. The electric tool according to claim 9, wherein:
the connecting structure comprises a lock claw engaging the first member in a direction perpendicular to a sliding direction of the rechargeable battery.

13. The electric tool according to claim 9, wherein the non-elastic material is higher both in strength and wear resistance than the guide groove structure.

14. An electric tool comprising:
a battery mount portion configured such that a rechargeable battery can be mounted to the battery mount portion as the rechargeable battery is slid in a sliding direction along the battery mount portion;
a drive device configured to reciprocally move a working tool with a supply of electric power from the rechargeable battery;
an electric terminal which is configured to be electrically connected to an electrical terminal of the rechargeable battery; and
a first battery contact portion, which is different from the electrical terminal, molded from an elastomeric material so as to be integrated with the battery mount portion and configured to contact the rechargeable battery when the rechargeable battery is mounted to the battery mount portion, the first battery contact portion being different from the electrical terminal of the electric tool and is configured not to be electrically connected with the rechargeable battery, wherein
the first battery contact portion urges the rechargeable battery in a first direction parallel to a reciprocating direction of the working tool,
the first battery contact portion is located inside of the battery mount portion,
the elastomeric material is introduced from the outer side to the inside of the battery mount portion for forming the first battery contact portion,
the elastomeric material comprises an inner portion, an outer portion, and a connecting portion,
the inner portion and the outer portion are respectively located inside and outside of the battery mount portion, and the connecting portion connects the inner portion and the outer portion,
the inner portion comprises the first battery contact portion, and
the connecting portion extends through a communication hole formed in the battery mount portion.

* * * * *